(12) United States Patent
Watanabe et al.

(10) Patent No.: US 6,547,381 B2
(45) Date of Patent: Apr. 15, 2003

(54) INK, IMAGE RECORDING PROCESS, INK CARTRIDGE, RECORDING UNIT, INK SET, CRUST-PREVENTING METHOD AND IMAGE FORMING APPARATUS

(75) Inventors: Tomonari Watanabe, Kanagawa (JP); Shinya Mishina, Kanagawa (JP); Koichi Osumi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/881,803

(22) Filed: Jun. 18, 2001

(65) Prior Publication Data

US 2002/0036677 A1 Mar. 28, 2002

(30) Foreign Application Priority Data

Jun. 23, 2000 (JP) ........................................ 2000-190328
Nov. 1, 2000 (JP) ........................................ 2000-334467

(51) Int. Cl.$^7$ ................................................ B41J 2/01
(52) U.S. Cl. .................................... 347/100; 347/96
(58) Field of Search ................................ 347/100, 101, 347/96, 95

(56) References Cited

U.S. PATENT DOCUMENTS

| | | | |
|---|---|---|---|
| 4,313,124 A | 1/1982 | Hara | 346/140 R |
| 4,345,262 A | 8/1982 | Shirato et al. | 346/140 R |
| 4,459,600 A | 7/1984 | Sato et al. | 346/140 R |
| 4,463,359 A | 7/1984 | Ayata et al. | 346/1.1 |
| 4,508,101 A | 4/1985 | Carter et al. | 126/436 |
| 4,558,333 A | 12/1985 | Sugitani et al. | 346/140 R |
| 4,565,859 A | 1/1986 | Murai et al. | 528/365 |
| 4,723,129 A | 2/1988 | Endo et al. | 346/1.1 |
| 4,740,796 A | 4/1988 | Endo et al. | 346/1.1 |
| 5,184,148 A | 2/1993 | Suga et al. | 346/1.1 |
| 5,218,376 A | 6/1993 | Asai | 346/1.1 |
| 5,571,311 A | 11/1996 | Belmont et al. | 106/20 R |
| 5,609,671 A | 3/1997 | Nagasawa | 106/20 R |
| 5,746,818 A | 5/1998 | Yatake | 106/31.86 |
| 5,976,233 A | 11/1999 | Osumi et al. | 106/31.86 |
| 6,221,141 B1 | 4/2001 | Takada et al. | 106/31.6 |
| 6,261,353 B1 * | 7/2001 | Doi et al. | 106/31.6 |

FOREIGN PATENT DOCUMENTS

| | | | |
|---|---|---|---|
| EP | 0 943 666 A3 | 9/1999 | ......... C09D/11/00 |
| EP | 0943666 A2 * | 9/1999 | ............. B41J/2/01 |
| JP | 54-56847 A | 5/1979 | ............. B41M/5/26 |
| JP | 59-123670 A | 7/1984 | ............. B41J/3/04 |
| JP | 59-138461 A | 8/1984 | ............. B41J/3/04 |
| JP | 60-71260 A | 4/1985 | ............. B41J/3/04 |
| JP | 60-161973 A | 8/1985 | ......... C07D/303/14 |
| JP | 63-221121 A | 9/1988 | ............. C08G/59/02 |
| JP | 64-9216 A | 1/1989 | ............. C08G/59/34 |
| JP | 2-140219 A | 5/1990 | ............. C08G/59/18 |
| JP | 3-134073 A | 6/1991 | ......... C09D/11/00 |
| JP | 3-210373 A | 9/1991 | ......... C09D/11/00 |
| JP | 2783647 B2 | 1/1992 | ............. B41J/2/05 |
| JP | 8-3498 A | 1/1996 | ......... C09D/11/00 |
| JP | 10-95941 A | 4/1998 | ......... C09D/11/00 |
| JP | 10-510862 A | 10/1998 | ......... C09D/11/00 |
| WO | WO 96/18695 | 6/1996 | ......... C09D/11/00 |

OTHER PUBLICATIONS

Journal of Polymer Science, Polymer Symposia, "Fourth International Symposium on Cationic Polymerization", No. 56, pp 383–395, Jun. 20–24, 1976.

* cited by examiner

Primary Examiner—Anh T. N. Vo
Assistant Examiner—Manish S Shah
(74) Attorney, Agent, or Firm—Fitzpatrick, Cella, Harper & Scinto

(57) ABSTRACT

An ink comprises a coloring material and an aqueous medium wherein the coloring material contains a self-dispersing type carbon black, in which self-dispersing carbon black a hydrophilic group combines with the surface of a carbon black directly or through another atomic group, and which ink contains potassium ion in an amount of 0.6% or more of the weight of the carbon black.

44 Claims, 19 Drawing Sheets

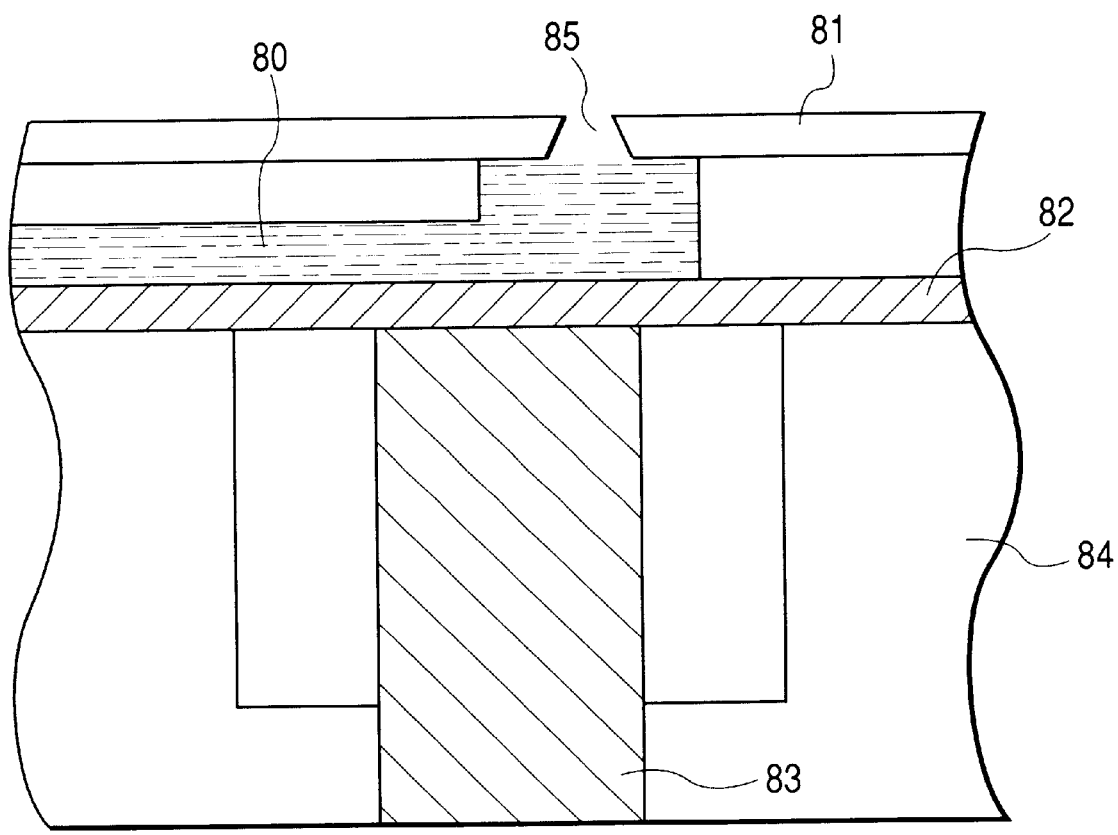

INK, IMAGE RECORDING PROCESS, INK CARTRIDGE, RECORDING UNIT, INK SET, CRUST-PREVENTING METHOD AND IMAGE FORMING APPARATUS

BACKGROUND OF THE INVENTION

1. Field of the Invention

The present invention relates to an ink, an image recording process, an ink cartridge, a recording unit, an ink set and an image forming apparatus.

2. Related Background Art

Inks with greatly various manners of being composed have heretofore been reported for writing utensils (fountain pens, marking pens, aqueous ball point pens, etc.) and ink-jet recording. In particular, in recent years, detailed research has been conducted regarding such issues as composition and physical properties of carbon black itself, and compositions and physical properties of inks containing such carbon black, whereby good recording can be conducted even on plain paper such as paper for copying, paper for reporting, notepaper, letter paper, bond paper and continuous business forms which are commonly used in offices.

For example, Japanese Patent Application Laid-Open No. 3-210373 describes water-based ink-jet inks comprising acid carbon black and an alkali-soluble polymer as a dispersing agent for the carbon black. Japanese Patent Application Laid-Open No. 3-134073 describes ink-jet inks comprising neutral or basic carbon black and a water-soluble resin as a dispersing agent for the carbon black, which are easy to be provided as dispersions excellent in shelf stability and ejection stability in bubble-jet recording apparatus.

Japanese Patent Application Laid-Open No. 8-3498 has offered a technical problem that when an ink comprising carbon black together with a dispersing agent is used as an ink for ink-jet recording, ejection becomes unstable, or sufficient optical density is not achieved, and discloses inks using self-dispersing carbon black capable of being dispersed in a solvent without using any dispersing agent as inks capable of solving such a problem. WO-A-No. 96/18695 (Japanese Patent Application Laid-Open No. 10-510862 through PCT route) and U.S. Pat. No. 5,746,818 (Japanese Patent Application Laid-Open No. 10-95941) also disclose ink-jet inks comprising self-dispersing carbon black and describe them as creating high-quality images.

The present inventors disclosed, in EP-A-No. 943,666, a technical means that a salt is added in addition to the above-described self-dispersing carbon black upon use of the self-dispersing carbon black as an ink-jet ink for the purpose of improving dependency of image density on the kind of paper and reducing bleeding at boundaries between a black ink and color inks.

By the way, as factors for considering the nature of an ink for ink-jet, there are the intermittent ejection stability and crusting property of the ink. Specifically, the intermittent ejection stability of the ink means the following property. Namely, when an ink is ejected from a predetermined nozzle of an ink-jet recording head, the ejection of the ink from the nozzle is stopped for a considerably long period of time (for example, about 12 hours) and the ink is then ejected again from the nozzle, the resumption of ejection of the ink may not be stably conducted in some cases to disorder printing. As described above, the operation that the ink is ejected from the predetermined nozzle, the ejection of the ink from the nozzle is stopped for the predetermined period of time and the ink is then ejected again from the nozzle is referred to as "intermittent ejection of ink", and unstable resumption of ejection of the ink is referred to as "poor intermittent ejection".

The crusting property of the ink means the following property. Namely, when ejection of an ink from a nozzle is stopped for a long period of time (for example, several days or longer) and the ink is then ejected again from the nozzle, a recovery operation for removing an ink which has undergone an increase in viscosity or solidification within the nozzle may be required in some cases. A state that the resumption of ejection of the ink is not stably conducted due to the viscosity increase or solidification of the ink within the nozzle is referred to as "crusting of ink", and an ink of which a great number of recovery operations is required for achieving stable resumption of ejection is referred to as "ink poor in crusting property".

Ink-jet inks have been required to have extremely high properties with the formation of ultrahigh-quality images by ink-jet recording in recent years.

SUMMARY OF THE INVENTION

However, it may not be said that technical findings for providing images having high optical density (OD) and sharp edge and achieving ink-jet ejection properties such as intermittent ejection stability and crusting property as to pigment inks comprising the above-described self-dispersing carbon black as a coloring material, particularly black pigment inks are sufficiently accumulated, and so their behavior as inks for ink-jet recording is not completely clarified.

For example, the ink comprising the self-dispersing carbon black and a salt proposed by the present inventors is extremely useful for lessening the dependency of image density on the kind of paper and the bleeding at boundaries between a black ink and color ink(s), which are the original objects. However, the present inventors have carried out a further investigation with a view toward establishing far excellent ink-jet recording techniques. As a result, it has been found that the intermittent ejection stability and crusting property of the inks greatly vary according to the structure of a recording head used.

The structures of a recording head is expected to be diversified with the wide product development of ink-jet printers and spread of application fields of ink-jet recording techniques, which has given us recognition that technical development is required as to inks which exhibit good and stable ink-jet properties against the diversification of recording heads while making the best use of the excellent properties of the inks comprising self-dispersing carbon black.

It is accordingly an object of the present invention to provide an ink comprising a pigment, particularly self-dispersing carbon black as a coloring material and having excellent ink-jet recording properties.

Another object of the present invention is to provide an image recording process capable of stably forming high-quality ink-jet recorded images.

A further object of the present invention is to provide a method of improving crusting property in ink-jet recording using a head having, in an ink flow path, a site where the flow resistance of the ink is greatly changed.

A still further object of the present invention is to provide an image recording process and an image forming apparatus which can stably provide high-quality prints, and an ink cartridge and a recording unit used therein.

A yet still further object of the present invention is to provide a method of lessening crusting on an ink-jet recording head.

A yet still further object of the present invention is to provide a method of improving intermittent ejection stability in an ink-jet recording process comprising the step of ejecting an ink plural times at a prescribed time interval, and particularly a method of improving intermittent ejection stability at the time when a recording head of the so-called side shooter type that a liquid is ejected in a direction opposite to an ink ejecting pressure-generating element is used.

The above objects can be achieved by the present invention described below.

According to an aspect of the present invention, there is provided an ink comprising a coloring material and an aqueous medium wherein the coloring material contains a self-dispersing type carbon black, the self-dispersing carbon black having a hydrophilic group bound to the surface thereof directly or through another atomic group, and wherein the ink contains potassium ion in an amount of 0.6 wt % or more of the weight of the carbon black.

According to an embodiment of the present invention, there is thus provided an ink comprising a coloring material at least containing self-dispersing carbon black having at least one hydrophilic group bound directly or through another atomic group to the surface thereof, and an aqueous medium, wherein the ink has a potassium ion in a proportion of 0.6 wt % or more based on the weight of the potassium ion to the carbon black.

According to an embodiment of the present invention, there is also provided an image recording process comprising the steps of: applying energy to an ink; and ejecting the ink from a recording head towards a recording medium, wherein the ink comprises a coloring material at least containing self-dispersing carbon black having a hydrophilic group bound directly or through another atomic group to the surface thereof, and an aqueous medium, and wherein the ink contains a potassium ion in an amount of 0.6% or more based on the weight of the self-dispersing carbon black.

According to an embodiment of the present invention, there is further provided an ink cartridge, comprising a container containing an ink, the ink comprising a coloring material containing a self-dispersing carbon black having a hydrophilic group bound directly or through another atomic group to the surface thereof, and an aqueous medium, and the ink having a potassium ion in an amount of 0.6 wt % or more based on the weight of the self-dispersing carbon black.

According to an embodiment of the present invention, there is still further provided a recording unit, comprising an ink container containing an ink and a recording head portion for ejecting the ink in the form of ink droplets, wherein the ink is an ink for ink-jet comprising a coloring material containing a self-dispersing carbon black having a hydrophilic group bound directly or through another atomic group to the surface thereof, and an aqueous medium, wherein the ink contains a potassium ion in an amount of 0.6 wt % or more based on the weight of the self-dispersing carbon black.

According to an embodiment of the present invention, there is yet still further provided an image recording apparatus, comprising a recording unit having an ink container containing an ink and a recording head for ejecting the ink in the form of ink droplets by the action of energy, wherein the ink comprises a coloring material containing a self-dispersing carbon black having a hydrophilic group bound directly or through another atomic group to the surface thereof, and an aqueous medium, wherein the ink contains a potassium ion in an amount of 0.6 wt % or more based on the weight of the self-dispersing carbon black.

According to another embodiment of the present invention, there is yet still further provided an image recording apparatus, comprising an ink cartridge equipped with a container containing an ink, and a recording head for ejecting the ink in the form of ink droplets by applying energy to the ink, wherein the ink comprises a coloring material containing a self-dispersing carbon black having a hydrophilic group bound directly or through another atomic group to the surface thereof, and an aqueous medium, wherein the ink contains a potassium ion in an amount of 0.6 wt % or more based on the weight of the self-dispersing carbon black.

According to an embodiment of the present invention, there is yet still further provided a method of lessening crusting on a recording head, comprising, upon ejection of an ink from the recording head by applying energy to the ink, using an ink for ink-jet comprising a coloring material containing a self-dispersing carbon black having a hydrophilic group bound directly or through another atomic group to the surface thereof, and an aqueous medium, wherein the ink contains potassium ion in an amount of 0.6 wt % or more based on the weight of the self-dispersing carbon black.

According to an embodiment of the present invention, there is yet still further provided an ink set, comprising in combination an ink comprising a coloring material selected from the group consisting of respective coloring materials for cyan, magenta, yellow, red, green and blue colors, and an ink comprising a coloring material containing a self-dispersing carbon black having a hydrophilic group bound directly or through another atomic group to the surface thereof, and an aqueous medium, wherein the ink contains potassium ion in an amount of 0.6 wt % or more based on the weight of the self-dispersing carbon black.

According to another embodiment of the present invention, there is yet still further provided an ink comprising a self-dispersing pigment having a hydrophilic group as a coloring material, a counter ion to the hydrophilic group and another ion having a polarity opposite to that of the hydrophilic group and having lower hydrating ability than that of the hydrophilic group.

According to an embodiment of the present invention, there is yet still further provided a recording head with an ink comprising a self-dispersing pigment having a hydrophilic group as a coloring material, a counter ion to the hydrophilic group and another ion having a polarity opposite to that of the hydrophilic group and having a lower hydrating ability than that of the hydrophilic group.

According to an embodiment of the present invention, there is yet still further provided an ink tank containing an ink comprising a self-dispersing pigment having a hydrophilic group as a coloring material, a counter ion to the hydrophilic group and another ion having a polarity opposite to that of the hydrophilic group and having a lower hydrating ability than that of the hydrophilic group.

According to another embodiment of the present invention, there is yet still further provided an ink-jet ink comprising self-dispersing carbon black having a hydrophilic group bound directly or through another atomic group to the surface thereof, a salt and an aqueous medium, wherein the ink retains the stable dispersed state of the self-dispersing carbon black even when the fluid state of the ink in a recording head has become a state of turbulent flow or a disturbed state.

According to another embodiment of the present invention, there is yet still further provided a method of lessening crusting on an ink-jet recording head equipped with an ink-ejection opening at a position opposite to an ink ejecting pressure-generating element in an ink-jet recording process comprising the step of ejecting an ink by means of the recording head, wherein the ink is an ink for ink-jet and comprises a coloring material containing a self-dispersing carbon black having a hydrophilic group bound directly or through another atomic group to the surface thereof, and an aqueous medium, wherein the ink contains a potassium ion in an amount of 0.6 wt % or more based on the weight of the self-dispersing carbon black.

According to a further embodiment of the present invention, there is yet still further provided a method of lessening crusting on an ink-jet recording head which has an ink flow path having a site where flow resistance of a liquid is greatly changed in an ink-jet recording process comprising the step of ejecting an ink by means of the recording head, the method comprising using, as said ink, an ink for ink-jet comprising a coloring material containing a self-dispersing carbon black having a hydrophilic group bound directly or through another atomic group to the surface thereof, and an aqueous medium, wherein the ink contains a potassium ion in an amount of 0.6 wt % or more based on the weight of the self-dispersing carbon black.

According to an embodiment of the present invention, there is yet still further provided a method of improving intermittent ejection stability in an ink-jet recording process comprising the step of repeating a process of applying energy to an ink to eject the ink from a recording head by an ink-jet system at a prescribed time interval, the method comprising using, as said ink, an ink for ink-jet comprising a coloring material containing a self-dispersing carbon black having a hydrophilic group bound directly or through another atomic group to the surface thereof, and an aqueous medium, wherein the ink contains a potassium ion in an amount of 0.6 wt % or more based on the weight of the self-dispersing carbon black.

According to another embodiment of the present invention, there is yet still further provided a method of improving intermittent ejection stability in an ink-jet recording process comprising the step of ejecting an ink plural times at a prescribed interval using a recording head from which the ink is ejected in a direction opposite to an ink ejecting pressure-generating element, the method comprising using, as said ink, an ink-jet ink comprising a coloring material containing a self-dispersing carbon black having a hydrophilic group bound directly or through another atomic group to the surface thereof, and an aqueous medium, wherein the ink contains a potassium ion in an amount of at least 0.6 wt % or more based on the weight of the self-dispersing carbon black.

According to a further embodiment of the present invention, there is yet still further provided a method of improving intermittent ejection stability in an ink-jet recording process comprising the step of ejecting an ink plural times at a prescribed time interval using an ink-jet recording head having, in an ink flow path, a site where flow resistance of a liquid is greatly changed, the method comprising using, as said ink, an ink-jet ink comprising a coloring material a self-dispersing carbon black having a hydrophilic group bound directly or through another atomic group to the surface thereof, and an aqueous medium, wherein the ink contains a potassium ion in an amount of 0.6 wt % or more based on the weight of the carbon black.

The present inventors carried out various experiments on the above-described objects. As a result, it was found that there is a correlation as to ink-jet properties between the kind of a salt added to an ink and a structure of a recording head. In, for example, a recording head illustrated in FIG. 24, reference numeral 251 indicates an ejection-energy-generating element, 252 an ejection opening, 253 a feed opening, 254 a substrate, and 255 an ejection opening plate.

As apparent from FIG. 24, the direction of an ink-flow is greatly curved at a site of the feed opening, and the ink is moved in the direction of the ejection-energy-generating element. A value expressing the degree of curvature of the ink at the site is an angle θ formed by the substrate at the site of the feed opening. When θ is not higher than 90°, the ink is curved at an angle of substantially at least 90°. The present inventors found that in such a recording head, intermittent ejection stability, crusting property and the like of an ink greatly vary according to the kind of a salt contained in the ink.

On the other hand, no conspicuous difference in intermittent ejection stability and crusting property was observed between inks respectively containing different salts in a recording head of a structure scarcely having portions which disturb a flow of an ink. Salts yielding excellent results irrespective of the structure of the recording head were found to be all salts containing potassium, and inks containing a sodium salt or ammonium salt were poor in intermittent ejection stability and crusting property in the recording head shown in FIG. 24 compared with the potassium salt-containing inks.

The reason why the potassium salt-containing inks are excellent in intermittent ejection stability and crusting property even when using the recording head shown in FIG. 24 is not clearly known. However, it is considered from the above-described finding that flowability of an ink in a recording head is greatly affected by an salt contained in the ink.

Specifically, it is inferred that a difference in intermittent ejection stability and crusting property between the pigment inks is attributable to the fact that the behavior of cations added as salts in the inks, particularly in a recording head, greatly vary according to the recording head used. As the causes thereof, there can be considered the behavior of the cation added as the salt and the behavior of the ink itself.

The consideration by the present inventors as to the behavior of an ink using a potassium salt as the salt will be first described with reference to FIGS. 27A to 27C and FIGS. 28A and 28B. FIG. 27A schematically illustrate a state of self-dispersing carbon black in an ink containing the carbon black. In FIG. 27A, reference numeral 2701 indicates the self-dispersing carbon black, 2705 a counter ion to a hydrophilic group in the carbon black, and 2703 a water molecule. Self-dispersing carbon black 2701 retains its stable dispersed state by keeping the affinity for the water molecules present thereabout.

A case where a potassium salt is added to the ink, and a case where a sodium salt is added to the ink are illustrated in FIGS. 27B and 27C, respectively. A potassium ion exhibits negative hydration property as illustrated in FIG. 28B, while a sodium ion exhibits positive hydration property as illustrated in FIG. 28A.

When the sodium ion is present at a prescribed concentration in the ink, water molecules 2703 present about the self-dispersing carbon black are localized on the side of the sodium ions as illustrated in FIG. 27C. On the other hand, no great change in the relationship between the self-dispersing carbon black and the water molecules is recognized in the ink containing the potassium ion compared with the ink containing no potassium ion.

It goes without saying that these states are momentary states of the respective inks typically depicted. It is not that the inks are always situated in these states. It is inferred that the inks are often situated in these states from the viewpoint of probability. Accordingly, it is not that the dispersion stability of the carbon black in the ink containing the sodium salt is immediately lowered.

However, the recording head having the site i.e. curved portions, at which the main flowing direction of an ink is changed by 90°, as illustrated in FIG. 24 is considered to cause turbulent flow or disturbance in the fluid state of the ink. Such a fluid state has a possibility that the apparent viscosity of the ink may be raised. In such a recording head as turbulence is caused in the fluid state of the ink, it is considered that a difference in dispersion stability of the self-dispersing carbon black caused by such a difference in a state between the carbon black and the water molecules as illustrated in FIGS. 27B and 27C is actualized as a difference in intermittent ejection stability and crusting property.

The present inventors have been led to make the present invention based on these findings and considerations.

Regarding a pigmented ink, in particular, a pigmented ink containing a self-dispersing pigment, the present inventors have studied a sole and a combined influences of the above mentioned 2 points to the ink-jet recording, and the inventors have found that the dependency of the intermittent ejection stability and crusting property on the recording head's structure can be reduced by adding potassium ion in an amount of 0.6 wt % or more based on the weight of the self-dispersing carbon black in the ink, and this is also effective even to a pigmented ink containing a self-dispersing carbon black to which a salt is added in order to alleviate bleeding between a black image and a color image. The pigmented ink according to the present invention can be handled much easier and quality of the image produced with the ink is satisfactory.

BRIEF DESCRIPTION OF THE DRAWINGS

FIG. 7 is a schematic cross-sectional view illustrating another exemplary construction of an ink-jet recording head.

DESCRIPTION OF THE PREFERRED EMBODIMENTS

Figure 1:
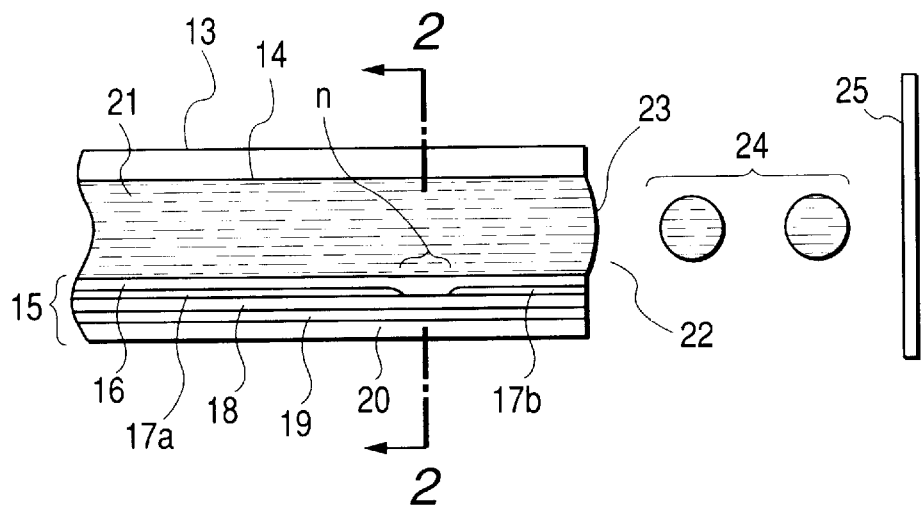
FIG. 1 is a longitudinal cross-sectional view of illustrating an exemplary head of an ink-jet recording apparatus.

The present invention will hereinafter be described in more detail by the preferred embodiments of the invention.

In the accompanying drawings, like parts are given the same reference characters.

The ink according to an embodiment of the present invention is an ink comprising a coloring material at least containing self-dispersing carbon black with at least one hydrophilic group bonded directly or through another atomic group to the surface thereof, and an aqueous medium, wherein the ink has a potassium ion in a proportion of at least 0.6% in terms of a mass ratio of the potassium ion to the carbon black. The respective components of this ink will hereinafter be described.

(Potassium Ion)

A concentration of a potassium ion in the ink according to this embodiment is preferably at least 0.6% in terms of a mass ratio of the potassium ion to the carbon black. When the concentration of the potassium ion is controlled to lower than 50% in terms of a mass ratio of the potassium ion to the carbon black, the shelf stability and the like of the ink itself can be retained at an extremely high level.

More specifically, when the concentration of the potassium ion is controlled within this range, an ink-jet ink markedly improved in intermittent ejection stability and crusting property is established. The present inventors consider that the improvement in intermittent ejection stability and crusting property is made to a greater extent by the effect by controlling the concentration of the potassium ion in the ink within the above range rather than the effect of enhancing the dispersion stability of the self-dispersing carbon black by adjusting the pH value of the ink within a proper range.

The above effect is demonstrated by the fact that when the pH value of an ink, to which potassium hydroxide, potassium benzoate or the like has been added in such a manner that the concentration of the potassium ion in the ink is within the above range, and the pH value of an ink, to which ammonia or an amine such as triethanolamine has been added, are adjusted so as to give an equal value, and the respective inks are compared with each other as to intermittent ejection stability and crusting property, the ink the potassium ion concentration in which has been controlled within the above range is more markedly improved in intermittent ejection stability and crusting property than the ink having the same pH value. Predominance is given to the ink, to which potassium has been added, in the improvement of intermittent ejection stability and crusting property even when compared with an ink to which lithium or sodium has been added.

It goes without saying that the stability of the ink according to the present invention is further improved at a pH on the alkali side. When this respect is combined with the present invention, the effects of the present invention are easier to be exhibited. The pH range of the ink used in the present invention is as follows. Anionic self-dispersing carbon black according to the present invention tends to be lacking in dispersion stability in an acid aqueous solution. In addition, taking contact of the ink with a recording head into consideration, the pH of the ink is preferably not lower than 7, but not higher than 10.

The detailed reason why the ink according to the present invention exhibits the above properties is not known. However, it is considered to be attributable to the fact that deterioration of dispersion stability and redispersibility of the self-dispersing carbon black is improved by the interaction between the potassium ion and the hydrophilic group bonded to the surface of carbon black. Namely, the present invention is basically different in idea from the addition of potassium hydroxide or the like for solubilizing, for example, a dispersing agent, i.e., the addition for alkalifying a dispersion.

The ink used in the present invention is higher in stability as a simple ink on the alkali side than in a neutral range. However, the essence of the present invention is not a seeking of only the stability as the simple ink, but is rather mainly intended to improve stability in the vicinity of an ejection opening. Even in this respect, the present invention is basically different in idea from the addition for alkalifying a dispersion.

Figure 27A:
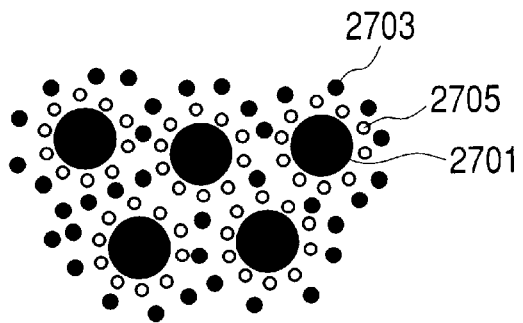
FIGS. 27A, 27B and 27C schematically and typically illustrate a mechanism that the effects of the present invention are exhibited.
Figure 27B:
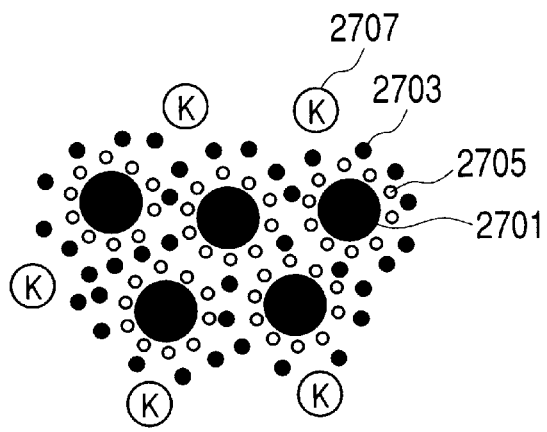
Figure 27C:
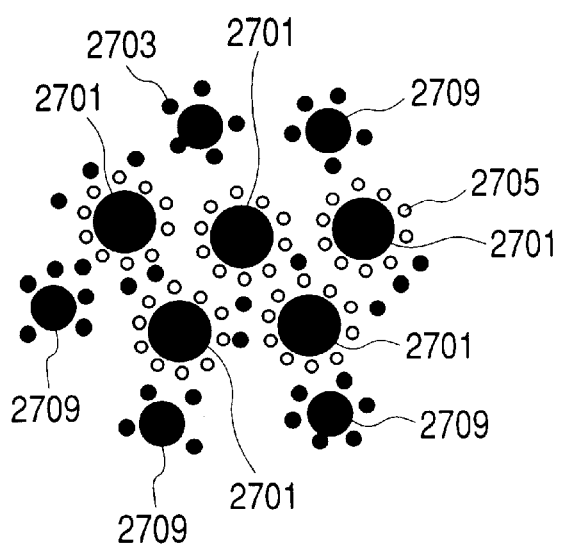

The mechanism that the effects of the present invention are exhibited by the presence of the potassium ion will hereinafter be described in more detail with reference to FIGS. 27A to 27C. FIGS. 27A to 27C typically illustrate the mechanism that the effects of the present invention are brought about by the presence of the potassium ion. In the drawings, reference numeral 2703 indicates a water molecule, 2709 a sodium ion, 2707 a potassium ion, 2701 self-dispersing carbon black, and 2705 a counter ion to a hydrophilic group in the carbon black.

As illustrated in FIG. 27A, self-dispersing carbon black 2701 has counter ion 2705 and is generally dispersed in a stable state that a great number of water molecules 2703 are present about the hydrophilic group and the counter ion. An image that a great number of monovalent cations, and other cations than the counter ion to the hydrophilic group of the carbon black are present is considered to be in such a state as illustrated in FIGS. 27B and 27C.

More specifically, when potassium ions 2707 are present in a great amount about the self-dispersing carbon black as other cations than the counter ion to the hydrophilic group of the self-dispersing carbon black, no great difference is made from the state illustrated in FIG. 27A, and the dispersion stability is not deteriorated. On the other hand, when sodium ions 2709 are present about the self-dispersing carbon black as other cations than the counter ion, water molecules 2703 tend to be present about sodium ions 2709 rather than self-dispersing carbon black 2701. As a result, it is considered that the dispersion stability of the self-dispersing carbon black is deteriorated.

At this time, it is considered that such a difference as illustrated in FIGS. 27A to 27C is hard to occur according to the kind of the counter ion, and the counter ion is not limited to the potassium ion in particular, and so a sodium ion or the like is also allowable. It goes without saying that ions move in an ink, and the same ion is not always present as the counter ion to the carbon black. Interionic replacement always occurs in the ink. Therefore, the conceptual views illustrated in FIGS. 27A to 27C seize on a certain moment.

However, it is considered that a probability that the ink is in the state illustrated in FIG. 27B becomes high when the potassium ions are present in plenty in the ink, and a probability that the ink is in the state illustrated in FIG. 27C becomes high when the sodium ions are present in plenty in the ink. A difference between both states is considered to be attributable to a difference in hydration property between both ions. The lithium ion, sodium ion, etc. are very easy to hydrate compared with the potassium ion.

Figure 28A:
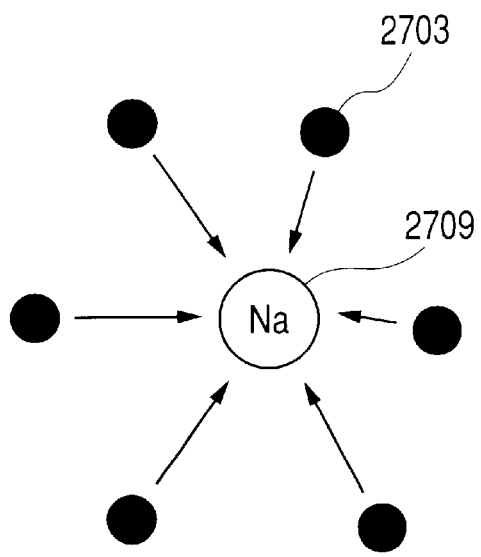
FIGS. 28A and 28B are conceptual views illustrating a point that a sodium ion or the like and a potassium ion are different in hydration property from each other.
Figure 28B:
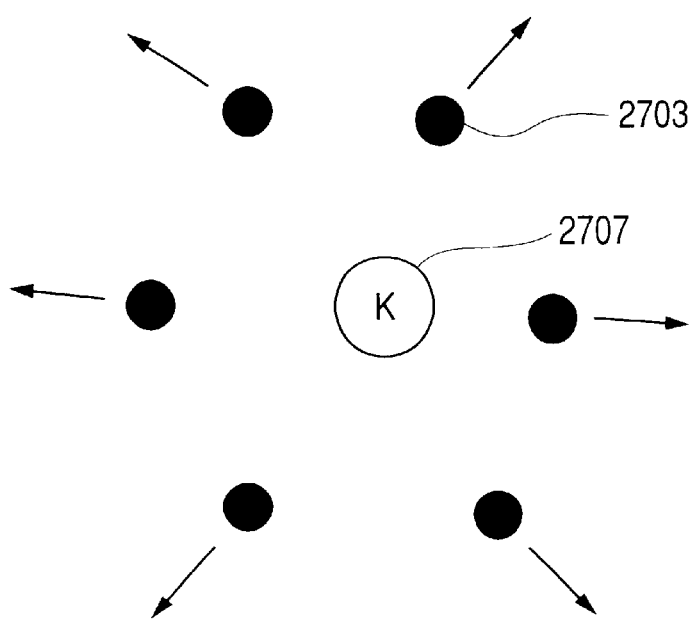

Regarding this, the present inventors think that this difference is attributable to the fact that the sodium and lithium ions exhibit positive hydration property, while the potassium ion exhibits negative hydration property as illustrated in FIGS. 28A and 28B. More specifically, it is considered that when lithium ions or sodium ions are present in the ink, water molecules naturally present about the self-dispersing carbon black to retain the dispersion stability of the self-dispersing carbon black leave about the self-dispersing carbon black in the cause of the strong hydration property of these ions, and come to be present about the cations.

On the other hand, the hydration property of the potassium ion itself is weaker than that of the self-dispersing carbon black, and so it is considered that the water molecules present about the self-dispersing carbon black are scarcely attracted about the potassium ion itself. Incidentally, FIGS. 28A and 28B are conceptual views illustrating the point that the sodium ion or the like and the potassium ion are different in hydration property from each other.

It goes without saying that it is ideal for all the self-dispersing carbon black in the ink to be in such a state as illustrated in FIG. 27B. As a result of a further extensive investigation by the present inventors, it has been found that the whole self-dispersing carbon black is not necessarily in such a state as illustrated in FIG. 27B in order to exhibit the effects of the present invention, and a part thereof may be in such a state as illustrated in FIG. 27C. Namely, it has been revealed that the effects of the present invention are exhibited even by a mixed system of the states illustrated in FIGS. 27B and 27C. Thus, the present inventors have been led to the conclusion that the effects of the present invention is exhibited so far as the potassium ion is contained in a proportion of at least 0.6% in terms of a mass ratio of the potassium ion to the carbon black.

Although the mechanism inferred by the present inventors has been described above in detail, it is important in the technical idea of the present invention that the hydration property of the monovalent cations present about the self-dispersing carbon black is weak, and there is an important meaning in the fact that the hydration property thereof is weaker than that of the self-dispersing carbon black. Accordingly, it is considered that other ions than the potassium ion may also fall within the range of the technical idea of the present invention so far as they have the same property (non-affinity for water) as the potassium ion.

The effect of the above-described phenomenon becomes more marked when a recording head having a site where a fluid state of an ink, which is attendant on the feed of the ink, is disturbed, for example, a recording head having, in an ink flow path, a site where flow resistance of the ink is greatly changed is used. The reason for it is not clearly known. However, the present inventors consider as follows.

Such a phenomenon as illustrated in FIGS. 27A to 27C is extremely hard to occur in an ink in a closed state (in other words, a state subjected to none of external factors except for time and gravity). Even in the same inks as described above, however, the crusting property and the like thereof greatly vary according to the structure of a recording head used.

In view of this respect, the present inventors considered that some in a recording head triggers off to greatly deteriorate the dispersion stability of an ink, and carried out an extensive investigation. As a result, it has been revealed that the deterioration is attributable to the structure itself of the recording head, not constitutive materials thereof. More specifically, the present inventors have been led to the conclusion that a great change in flow resistance in the ink flow path triggers off the deterioration.

(Self-dispersing Carbon Black)

The self-dispersing carbon black is carbon black to the surface of which at least one hydrophilic group is bonded directly or through another atomic group. As a result that this hydrophilic group has been introduced into the surface of carbon black, it is unnecessary to use a dispersing agent for dispersing carbon black like the conventional inks. The self-dispersing carbon black preferably has an ionicity.

Examples of self-dispersing carbon black anionically charged include those obtained by bonding, for example, any of such hydrophilic groups as described below to the surface of carbon black:

—COOM, —SO$_3$M, —PO$_3$HM and —PO$_3$M$_2$ wherein M is hydrogen, alkali metal, ammonium or organic ammonium. Among these, carbon black anionically charged by bonding —COOM or —SO$_3$M to the surface thereof can be particularly preferably used in the present invention, since its dispersibility in the inks is good.

Of those represented by "M" in the above-described hydrophilic groups, specific examples of the alkali metal include Li, Na, K, Rb and Cs, and specific examples of the organic ammonium include methylammonium, dimethylammonium, trimethylammonium, ethylammonium, diethylammonium, triethylammonium, methanolammonium, dimethanolammonium and trimethanolammonium.

An ink containing self-dispersing carbon black, in which M is ammonium or organic ammonium, can more improve the water fastness of recorded images formed therefrom. Accordingly, such carbon black can be preferably used from such a point of view. This is considered to be attributable to influence by evaporation of ammonia caused by decomposition of the ammonium when such an ink is applied to a recording medium.

The self-dispersing carbon black, in which M is ammonium, can be prepared in accordance with, for example, a process in which self-dispersing carbon black, in which M is an alkali metal, is subjected to ion-exchange to substitute ammonium for M, or a process in which an acid is added to the self-dispersing carbon black to change into the H type, and ammonium hydroxide is then added to substitute ammonium for M.

As a method for preparing anionically charged self-dispersing carbon black, may be mentioned, for example, a process in which carbon black is subjected to an oxidation treatment with sodium hypochlorite. By this process, a —COONa group can be chemically bonded to the surface of carbon black.

By the way, such various hydrophilic groups as described above may be directly bonded to the surface of carbon black. Alternatively, they may be indirectly bonded to the surface of carbon black by intervening another atomic group between the surface of carbon black and such a hydrophilic group.

Specific examples of the atomic group include linear or branched alkylene groups having 1 to 12 carbon atoms, a substituted or unsubstituted phenylene group, and a substituted or unsubstituted naphthylene group. Examples of substituent groups on the phenylene group and the naphthylene group include linear or branched alkyl groups having 1 to 6 carbon atoms. Specific examples of the combination of the atomic group and the hydrophilic group include —C$_2$H$_4$—COOM, —Ph—SO$_3$M and —Ph—COOM, wherein —Ph— is a phenylene group, and M has the same meaning as defined above.

As a result of a further investigation by the present inventors, it has been found that when carbon black, having a hydrophilic-group density of at least 1.8 $\mu$mol/m$^2$ on its surface among such anionically charged self-dispersing carbon black as described above, is used together with a potassium ion, the resulting ink exhibits excellent intermittent ejection stability and crusting property. As the reason for it, it is considered that the dispersion stability and redispersibility of the self-dispersing carbon black are improved by the interaction between the potassium ion and the hydrophilic group. It is also considered that when the carbon black having a hydrophilic-group density within this range is used, this effect appears more sensitively.

In the present invention, the self-dispersing carbon black contained in the ink is not limited to one kind, and two or more kinds of such carbon black may be used in combination to adjust the color tone of the ink. The amount of the self-dispersing carbon black to be added in the pigment inks according to the present invention is preferably within a range of from 0.1 to 15% by mass, more preferably from 1 to 10% by mass, based on the total mass of each ink. In addition to the self-dispersing carbon black, a dye may be used to adjust the color tone of the inks.

(Hydrophilic-group Density)

As a method for measuring the hydrophilic-group density in the self-dispersing carbon black, there is, for example, a method in which a carbon dispersion is prepared, all counter ions are changed to sodium ions, the amount of the sodium ions is measured by a probe type sodium ion electrode to find an amount of sodium ions contained in the whole dispersion. The hydrophilic-group density is determined in terms of ppm per solid from this amount of the sodium ions and the concentration of the carbon black in the dispersion. Incidentally, the conversion is conducted supposing that the hydrophilic group such as a carboxylic group is present in the same number of moles as the sodium ion.

Recording heads will hereinafter be described. A head by which the effects of the present invention is more markedly exhibited, i.e., a recording head hard to use when the self-dispersing carbon black-containing ink disclosed by the present inventors, to which a salt is added, is used, will now be described. The above head includes a recording head having, in an ink flow path, a site where flow resistance of the ink is greatly changed. Specific typical examples thereof include the following heads:

1) a recording head having, in a head tip, a site where the flowing direction of an ink is curved by substantially at least 90°,
2) a recording head having, in a head tip, sites where the surface energy is greatly different from those of the surroundings, and
3) a recording head having, in a head tip, sites where the width of the flow path is within 20 µm or shorter.

The above-described sites are considered to further destabilize the dispersibility of the ink when the ink's dispersibility becomes partially unstable by some cause. These heads will be described in more detail by reference to the drawings.

Figure 24:
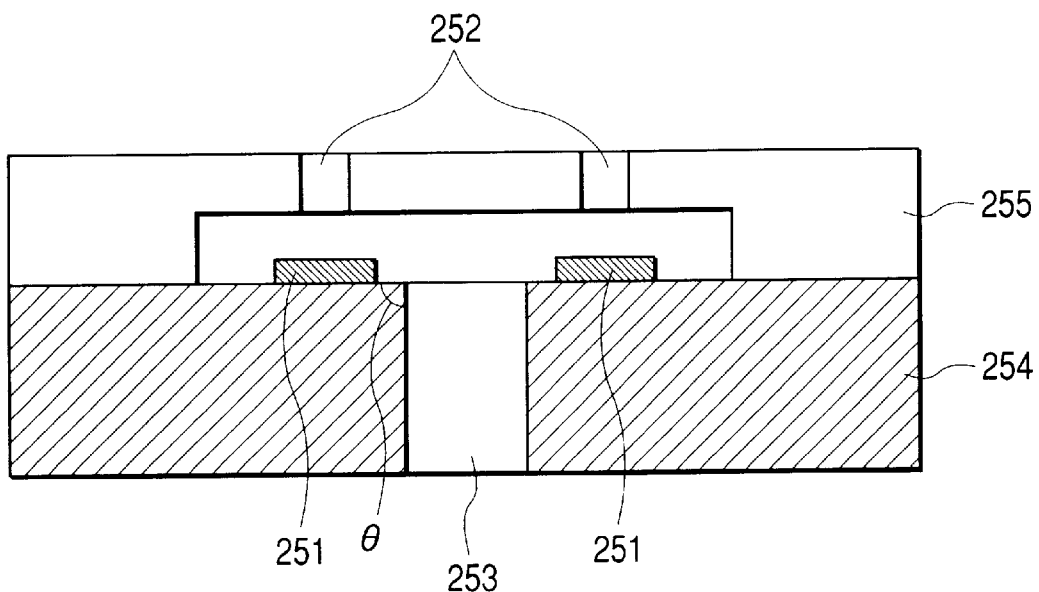
FIG. 24 is a schematic cross-sectional view illustrating a first exemplary head of a structure by which the effects of the present invention are exhibited more effectively.
Figure 25:
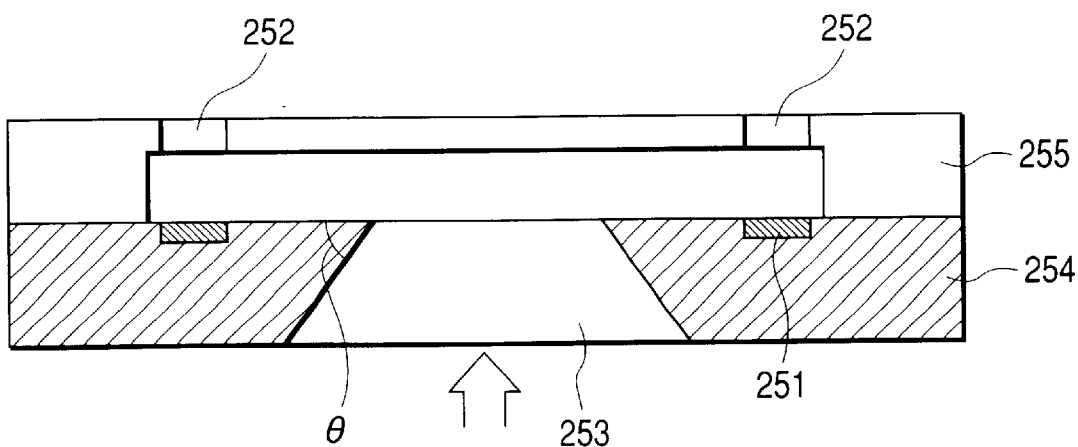
FIG. 25 is a schematic cross-sectional view illustrating a second exemplary head of a structure by which the effects of the present invention are exhibited more effectively.

The recording head of 1) is first described. FIGS. 24 and 25 are schematic cross-sectional views illustrating heads of a structure by which the effects of the present invention are exhibited more markedly. In FIGS. 24 and 25, reference numeral 251 indicates an ejection-energy-generating element, 252 an ejection opening, 253 a feed opening, 254 a substrate, and 255 an ejection opening plate.

As apparent from the drawings, an ink is greatly curved at a site of the feed opening to be moved in directions of the ejection-energy-generating elements. A value expressing the degree of curvature of the ink at this time is an angle θ formed by the substrate at the site of the feed opening. When θ is not higher than 90°, the ink is curved at an angle of substantially at least 90°.

In this case, the ink portions are considered to be hard to be mixed with each other by self-diffusion in, for example, the ink in the head tip so as to become uniform. More specifically, dispersion stabilization is prevented by mixing an ink portion that has an unstable dispersion due to the presence of a site where a sort of stagnation is easy to form, into contact with an ink portion that maintains a stable dispersion. In addition, disturbance or turbulent flow causes an increase in the apparent viscosity of the ink. It is considered that the influence of the self-dispersing carbon black having an unstabilized dispersion as described above is actualized at this time.

Figure 26:
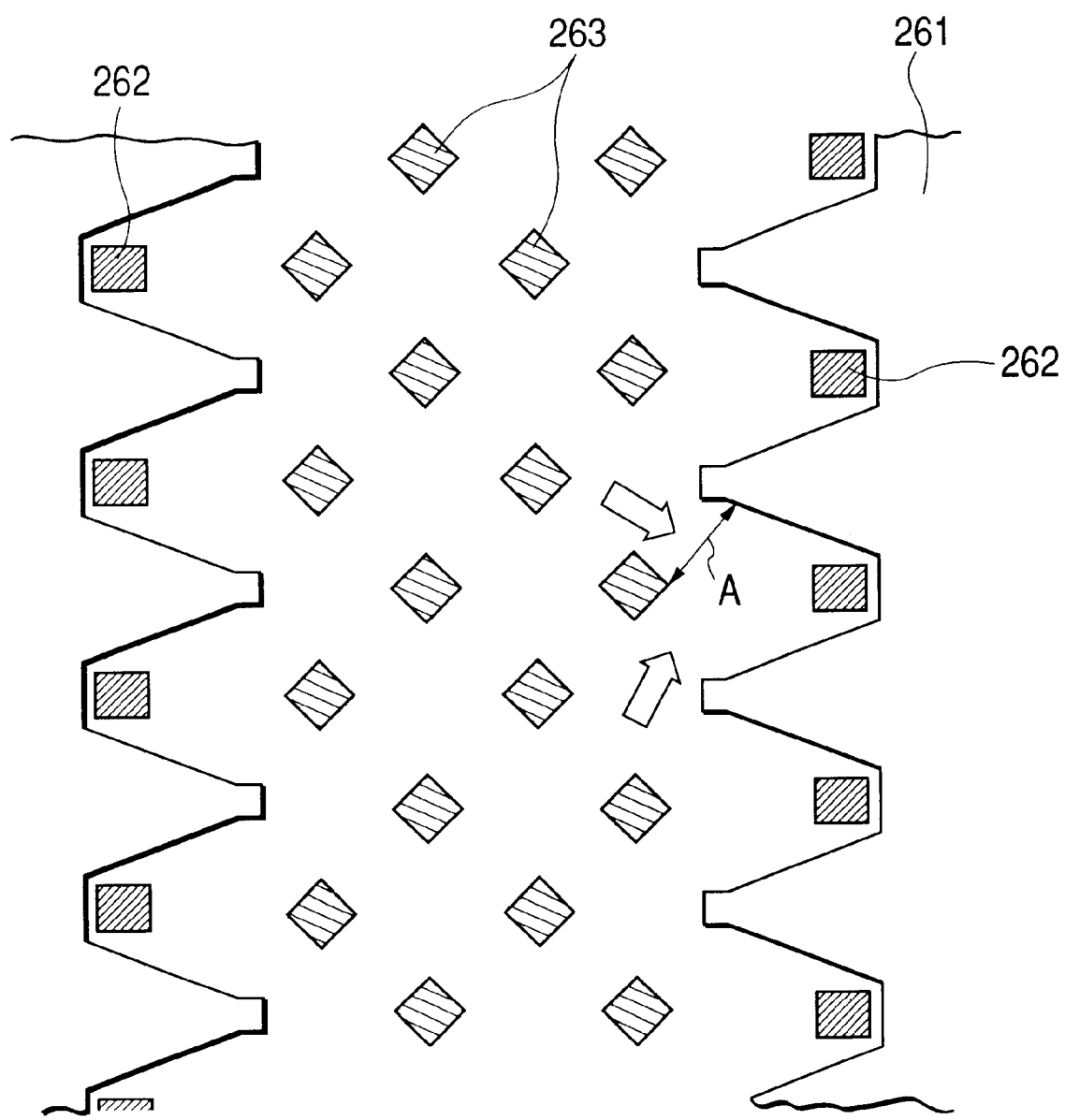
FIG. 26 is a schematic cross-sectional view illustrating a third exemplary head of a structure by which the effects of the present invention are exhibited more effectively.

The recording head of 2) is now described. FIG. 26 schematically illustrates a head having sites where the surface energy is greatly different from those of the surroundings. In this schematic view, the sites where the surface energy is greatly different from those of the surroundings are illustrated as projections. In FIG. 26, reference numeral 261 indicates a coating resin layer, 262 an ejection-energy-generating element, 263 a projection. In this case, it is considered that an ink is trapped in the vicinity of the projection due to a difference in surface energy becomes hard to move. In addition, disturbance or turbulent flow causes an increase in the apparent viscosity of the ink. It is considered that the influence of the self-dispersing carbon black having an unstabilized dispersion as described above is actualized at this time.

The recording head of 3) is now described by reference to FIG. 26 like the recording head in 2). A portion shown by A in FIG. 26 is narrower than surroundings thereof in the ink flow path. Specifically, portions having a width of 20 µm or shorter are present. In such a head, as with the case of 1), the ink portions are hard to be mixed with each other by self-diffusion in the tip so as to become uniform. More specifically, dispersion stabilization is prevented by mixing an ink portion that has become unstable in dispersion due to the presence of a site where a sort of stagnation is easy to form, with an ink portion that maintains a stable dispersion. In addition, disturbance or turbulent flow causes an increase in the apparent viscosity of the ink. It is considered that the influence of the self-dispersing carbon black unstabilized in dispersion as described above is actualized at this time.

It goes without saying that when the head of 1), 2) and 3) are combined, the effects of the present invention become more marked. For example, a head having a flow path width of 20 µm or shorter in the vicinity of a site where the flowing direction of an ink is curved is mentioned. As an example where the effects of the present invention are markedly exhibited, may be mentioned an example where a recording head the ejection quantity of which is at most 40 ng per dot is used, because it is considered that the recording head the ejection quantity of which is small tends to correspond to the recording head of 3) in the examples of the recording heads having a site where flow resistance of the ink is greatly changed. It goes without saying that the present invention is not limited to only the conditions of the ejection quantity.

A method for adjusting the content of the potassium ion in the ink will now be described. The adjustment method includes a method in which the potassium ion is added in the form of a potassium salt.

Specific examples of the potassium salt include potassium hydroxide, potassium benzoate, potassium phthalate, potassium acetate, potassium succinate, potassium citrate, potassium gluconate, potassium nitrate, potassium phosphate, potassium sulfate, potassium carbonate, potassium chloride an potassium bromide. Such potassium salts as mentioned above may be used either singly or in any combination thereof.

When the potassium ion is added in the form of the salt, a part or the whole of the counter ion to the functional group on the surface of the self-dispersing carbon black is replaced by the potassium ion though the replacement naturally depends on the amount of the salt added.

(Monovalent Cation)

The total content of monovalent cations in the water-based pigment ink according to this embodiment is preferably within a range of from 0.05 mol/L to 1 mol/L, particularly from 0.1 mol/L to 0.5 mol/L based on the total amount of the ink. When the total content of the monovalent cations falls within this range, the resulting ink can provide images having high image density and high quality, and causes no problem as to properties as an ink, for example, shelf stability and the like.

The reason why the images having high image density and high quality can be provided is considered to be attributable to the fact that the ink undergoes rapid solid-liquid separation on the surface of a recording medium after the ink is applied to the surface thereof when the monovalent cations are contained in the prescribed total amount in the ink. The total content of the monovalent cations is important for this phenomenon.

If the total content of the monovalent cations is lower than the lower limit, specifically 0.05 mol/L, solid-liquid separation may not occur at a necessary speed in some cases. If the total content exceeds 1 mol/L on the other hand, unpreferable cases may occur from the viewpoint of stability of the ink itself.

As factors that this solid-liquid separation is caused, capillarity, evaporation of water, etc. are considered. However, the present inventors consider that the greatest factor that solid-liquid separation of the ink according to the present invention is caused is evaporation of water after ejection of the ink. It goes without saying that capillarity on the recording medium after ink-droplet impact is one of factors that cause the solid-liquid separation. However, the present inventors consider that the evaporation of water after ejection of the ink is the greatest factor that causes the solid-liquid separation of the ink according to the present invention on the basis of the following fact.

The ink according to the present invention more rapidly undergoes solid-liquid separation compared with an ink, the total content of the monovalent cations in which is lower than the prescribed lower limit, even on the surface of clean glass. More specifically, this fact truly demonstrates that the ink according to the present invention undergoes solid-liquid separation even when no capillarity is caused. Accordingly, the present inventors has been led to consideration that the greatest factor that solid-liquid separation of the ink according to the present invention is caused is evaporation of water after ejection of the ink.

The wording "content of the monovalent cation" as used herein means an amount of all monovalent cations contained in the ink. More specifically, it means an amount of all cations which are present as cations in the ink and can be detected as cations, for example, a counter ion to the functional group on the surface of the self-dispersing carbon black, a cation added as a pH adjuster, a cation added in the form of a salt, etc. Quantitative analysis methods of the cations in the ink include a combination of ion chromatography and plasma emission spectrometry.

Examples of the monovalent cations include alkali metal ions, an ammonium ion and organic ammonium ions. More specifically, examples of the alkali metal ions include lithium, sodium and potassium ions. Examples of the organic ammonium ions include mono- to tetramethylammonium ions, mono- to tetraethylammonium ions and mono- to tetramethanolammonium ions.

In order to adjust the total content of the cations in the ink, may be mentioned a method in which such cations as described above are added in the form of salts. Examples of a combination of a cation with an anion which becomes a counter ion thereto include the following combinations:

Cation: one selected from ammonium, potassium, sodium and lithium ions and the like, particularly, an ammonium ion; and Anion: one selected from halide ions (chloride ion and the like), an acetate ion, a benzoate ion and the like.

These salts provide inks excellent in image density and image quality in particular because, probably, they have excellent compatibility with the self-dispersing carbon black.

(Aqueous Medium)

A preferable aqueous medium capable of imparting such properties as described above to the inks according to the respective embodiments is water or a mixed solvents of water and a water-soluble organic solvent. As the water-soluble organic solvent, is particularly preferred a solvent having an effect of preventing the drying of inks. With respect to the water, it is desirable to use deionized water instead of tap water containing various ions.

(Water-soluble Organic Solvent)

Specific examples of the water-soluble organic solvent used in the present invention include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and ketone alcohols such as acetone and diacetone alcohol; ethers such as tetrahydrofuran and dioxane; polyalkylene glycols such as polyethylene glycol and polypropylene glycol; polyols the alkylene moiety of which has 2 to 6 carbon atoms, such as ethylene glycol, propylene glycol, butylene glycol, triethylene glycol, thiodiglycol, hexylene glycol and diethylene glycol; lower alkyl ether acetates such as polyethylene glycol monomethyl ether acetate; 1,2,6-hexanetriol; glycerol; lower alkyl ethers of polyhydric alcohols, such as ethylene glycol monomethyl (or monoethyl) ether, diethylene glycol methyl (or ethyl) ether and triethylene glycol monomethyl (or monoethyl) ether; polyhydric alcohols such as trimethylolpropane and trimethylolethane; N-methyl-2-pyrrolidone; 2-pyrrolidone; 1,3-dimethyl-2-imidazolidinone; and acetylene alcohol. The water-soluble organic solvents mentioned above may be used either singly or in any combination thereof.

No particular limitation is imposed on the content of the water-soluble organic solvent contained in the water-based pigment inks according to the present invention. However, it is preferably within a range of from 3 to 50% by mass based on the total mass of the ink. On the other hand, the content of water contained in the inks is preferably within a range of from 50 to 95% by mass based on the total mass of the ink.

When the inks are required to adjust their surface tensions, it is effective to suitably add surfactants such as acetylene alcohol represented by the following chemical formula, penetrable solvents, etc. in a prescribed amount.

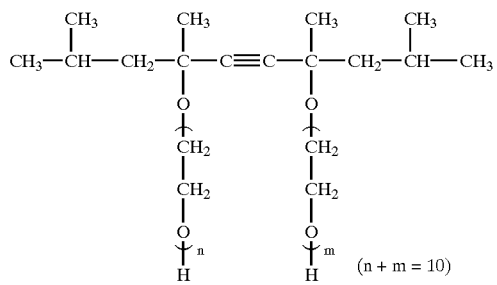

Besides the above components, a surfactant, an antifoaming agent, an antiseptic, a mildewproofing agent and the like may be added to the water-based pigment inks according to the present invention, as needed, to provide them as inks having desired physical properties. A commercially available water-soluble dye or the like may also be added.

As described above, the inks according to the present invention are particularly effective when used in ink-jet recording. Ink-jet recording methods include a recording method in which mechanical energy is applied to an ink to eject droplets of the ink, and a recording method in which thermal energy is applied to an ink to eject droplets of the ink by bubbling of the ink. The inks according to the present invention are particularly suitable for use in these recording methods.

(Ink-jet Recording Apparatus and Ink-jet Recording Method)

Figure 2:
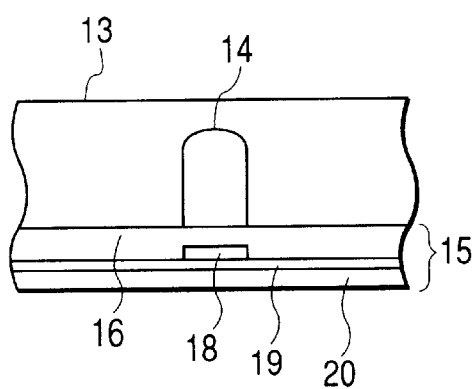
FIG. 2 is a transverse cross-sectional view of the head of the ink-jet recording apparatus.

As an ink-jet recording apparatus, an exemplary construction of a head, which is a main component of an apparatus making good use of thermal energy is shown in FIGS. 1 and 2.

FIG. 1 is a cross-sectional view of a head 13 taken along the flow path of ink, and FIG. 2 is a cross-sectional view taken along line 2—2 in FIG. 1. The head 13 is formed by bonding a glass, ceramic, silicon or plastic plate or the like having a flow path (nozzle) 14 through which an ink is passed, to a heating substrate 15. The heating substrate 15 is composed of a protective layer 16 made of silicon oxide, silicon nitride, silicon carbide or the like, electrodes 17a and 17b formed of aluminum, gold, aluminum-copper alloy or the like, a heating resistor layer 18 formed of a high-melting material such as $HfB_2$, TaN or TaAl, a heat accumulating layer 19 formed of silicon oxide, aluminum oxide or the like, and a substrate 20 made of silicon, aluminum, aluminum nitride or the like having a good heat radiating property.

Now, upon application of pulsed electric signals to the electrodes 17a and 17b of the head 13, the heating substrate 15 rapidly generates heat at the region shown by "n" to form bubbles in an ink 21 which is in contact with this region. A meniscus 23 of the ink is projected by the pressure thus produced, and the ink 21 is ejected in the form of ink droplets 24 from an ejection orifice 22 through the nozzle 14 of the head toward a recording medium 25.

Figure 3:
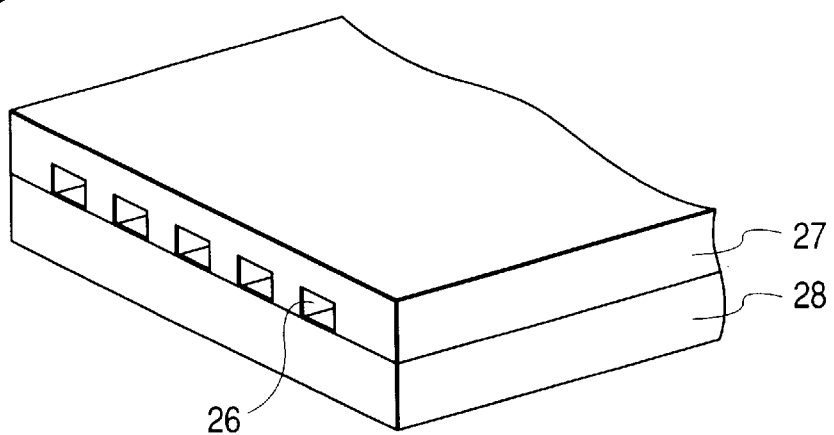
FIG. 3 is a perspective view of the appearance of a multi-head which is an array of such heads as shown in FIG. 1.

FIG. 3 illustrates an appearance of a multi-head comprised of an array of a number of heads as shown in FIG. 1. The multi-head is formed by closely bonding a glass plate 27 having a number of grooves 26 to a heating head 28 similar to that described in FIG. 1.

Figure 4:
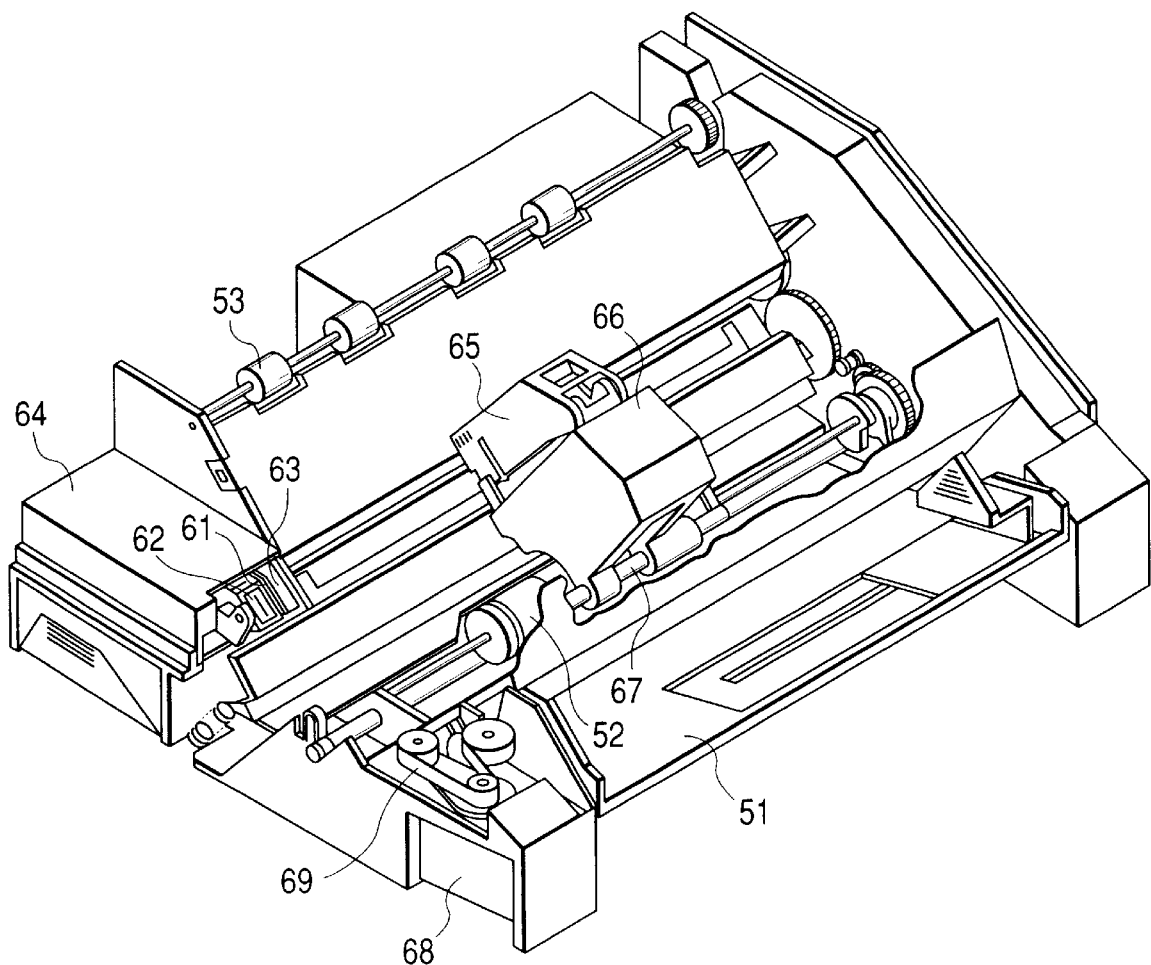
FIG. 4 is a schematic perspective view illustrating an exemplary ink-jet recording apparatus.

FIG. 4 illustrates an example of an ink-jet recording apparatus in which such a head as described above has been incorporated. In FIG. 4, reference numeral 61 designates a blade serving as a wiping member, one end of which is a stationary end held by a blade-holding member to form a cantilever. The blade 61 is provided at a position adjacent to a region in which a recording head 65 operates, and in this embodiment, is held in such a form that it protrudes into the course through which the recording head 65 is moved.

Reference numeral 62 indicates a cap for the face of ejection openings of the recording head 65, which is provided at a home position adjacent to the blade 61, and is so constructed that it moves in a direction perpendicular to a direction in which the recording head 65 is moved, and comes into contact with the face of the ejection openings to cap it. Reference numeral 63 denotes an ink absorbing member provided adjoiningly to the blade 61 and, similar to the blade 61, held in such a form that it protrudes into the course through which the recording head 65 is moved. The above-described blade 61, cap 62 and ink absorbing member 63 constitute an ejection-recovery portion 64, where the blade 61 and ink absorbing member 63 remove water, dust and/or the like from the face of the ink-ejecting openings.

Reference numeral 65 designates the recording head having an ejection-energy-generating means and serving to eject the ink onto a recording medium set in an opposing relation to the ejection opening face provided with the ejection openings to conduct recording. Reference numeral 66 indicates a carriage on which the recording head 65 is mounted so that the recording head 65 can be moved. The carriage 66 is slidably interlocked with a guide shaft 67 and is connected (not illustrated) at its part to a belt 69 driven by a motor 68. Thus, the carriage 66 can be moved along the guide shaft 67 and hence, the recording head 65 can be moved from a recording region to a region adjacent thereto. Reference numerals 51 and 52 denote a feeding part from which the recording medium is inserted, and feed rollers driven by a motor (not illustrated), respectively.

With such a construction, the recording medium is fed to the position opposite to the ejection opening face of the recording head 65, and discharged from a discharge section provided with discharge rollers 53 with the progress of recording. In the above construction, the cap 62 in the ejection-recovery portion 64 is receded from the path of motion of the recording head 65 when the recording head 65 is returned to its home position after completion of recording, and the blade 61 remains protruded into the path of motion. As a result, the ejection opening face of the recording head 65 is wiped.

When the cap 62 comes into contact with the ejection opening face of the recording head 65 to cap it, the cap 62 is moved so as to protrude into the path of motion of the recording head 65. When the recording head 65 is moved from its home position to the position at which recording is started, the cap 62 and the blade 61 are at the same positions as the positions for the wiping as described above. As a result, the ejection opening face of the recording head 65 is also wiped at the time of this movement.

The above movement of the recording head 65 to its home position is made not only when the recording is completed or the recording head 65 is recovered for ejection, but also when the recording head 65 is moved between recording regions for the purpose of recording, during which it is moved to the home position adjacent to each recording region at given intervals, where the ejection opening face is wiped in accordance with this movement.

Figure 5:
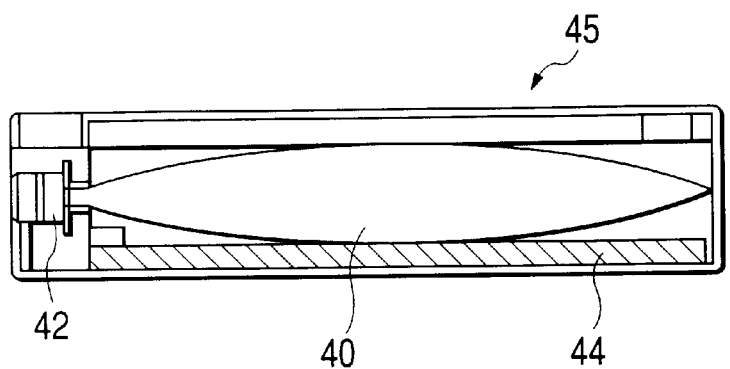
FIG. 5 is a longitudinal cross-sectional view illustrating an exemplary ink cartridge.

FIG. 5 illustrates an exemplary ink cartridge 45 in which an ink to be fed to a head through a member for feeding the ink, for example, a tube is contained. Here, reference numeral 40 designates an ink container portion containing the ink to be fed, as exemplified by a bag for ink. One end thereof is provided with a stopper 42 made of rubber. A needle (not illustrated) may be inserted into this stopper 42 so that the ink in the bag 40 for ink can be fed to the head. Reference numeral 44 indicates an ink absorbing member for receiving a waste ink. It is preferred that the ink container portion 40 be formed of a polyolefin, in particular, polyethylene, at its surface with which the ink comes into contact.

Figure 6:
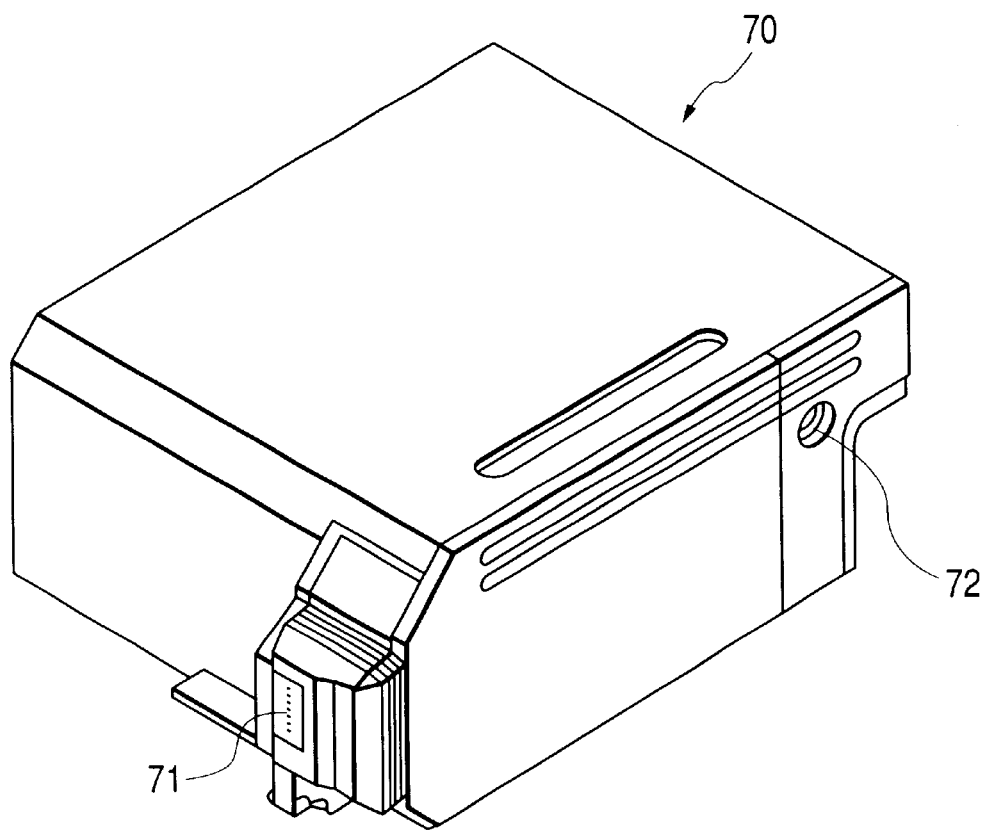
FIG. 6 is a perspective view illustrating an exemplary recording unit.

The ink-jet recording apparatus used in the present invention are not limited to the apparatus as described above in which the head and the ink cartridge are separately provided. Therefore, a device in which these members are integrally formed as shown in FIG. 6 can also be preferably used. In FIG. 6, reference numeral 70 designates a recording unit, in the interior of which an ink container portion containing an ink, for example, an ink absorbing member, is contained. The recording unit 70 is so constructed that the ink in such an ink absorbing member is ejected in the form of ink droplets through a head 71 having a plurality of orifices. In the present invention, polyurethane is preferably used as a material for the ink absorbing member.

The ink container portion may be constructed without using the ink absorbing member by a bag for ink in the interior of which a spring or the like is provided. Reference numeral 72 indicates an air passage for communicating the interior of the recording unit 70 with the atmosphere. This recording unit 70 is used in place of the recording head 65 shown in FIG. 4, and is detachably installed on the carriage 66.

As a form of the ink-jet recording apparatus making good use of mechanical energy, may be mentioned an On-Demand type ink-jet recording head comprising a nozzle-forming substrate having a plurality of nozzles, pressure-generating elements composed of a piezoelectric material and an electrically conductive material provided in an opposing relation to the nozzles, and an ink filled around the pressure-generating elements, wherein the pressure-generating elements are changed by voltage applied to eject droplets of the ink from the nozzles. An example of the construction of a recording head, which is a main component of such a recording apparatus, is illustrated in FIG. 7.

The head is composed of an ink flow path 80 communicating with an ink chamber (not illustrated), an orifice plate 81 through which ink droplets having a desired volume are ejected, a vibration plate 82 for directly applying a pressure to the ink, a piezoelectric element 83 bonded to the vibration plate 82 undergoing a change according to an electric signal, and a substrate 84 adapted to support and fix the orifice plate 81, the vibration plate 82 and the like thereon.

In FIG. 7, the wall of the ink flow path 80 is formed with a photosensitive resin or the like. The orifice plate 81 is made of a metal such as stainless steel or nickel, and an ejection opening 85 of which is formed by electroforming, punching by press working, or the like. The vibration plate 82 is formed with a film of a metal such as stainless steel, nickel or titanium and a high-modulus resin film or the like. The piezoelectric element 83 is made of a dielectric material such as barium titanate or PZT.

The recording head with the above construction is operated in such a manner that pulsed voltage is applied to the piezoelectric element 83 to generate a stress causing strain, the vibration plate 82 bonded to the piezoelectric element 83 is deformed by the energy of the stress, and the ink in the ink flow path 80 is thus perpendicularly pressurized to eject ink droplets (not illustrated) from the ejection opening 85 of the orifice plate, thereby conducting recording.

Such a recording head is used by incorporating it into an ink-jet recording apparatus similar to that illustrated in FIG. 4. Operation of details of the ink-jet recording apparatus may be conducted in the same manner as described above.

FIGS. 8A to 8F are cross-sectional views illustrating an exemplary production process of a recording head, by which the effects of the present invention is markedly exhibited, in order of step. It goes without saying that the present invention is not limited to the recording heads produced in accordance with this production process.

Figure 8A:
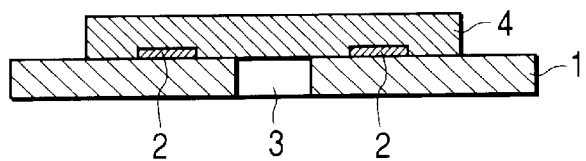
FIGS. 8A, 8B, 8C, 8D, 8E and 8F are cross-sectional views illustrating an exemplary production process of an ink-jet recording head in order of step.

A substrate 1 composed of glass, ceramic, plastic, metal or the like is first provided as illustrated in FIG. 8A.

Such a substrate 1 may be used without any particular limitation as to its form, material and the like so far as it may function as a part of members for forming a liquid flow path and as a support for material layers for forming an ink flow path and ink-ejection opening, which will be described subsequently. On the substrate 1, a desired number of ink ejection-energy-generating elements 2 such as electrothermal conversion elements or piezoelectric elements are arranged. Ejection energy for ejecting ink droplets is applied to an ink by such an ink ejection-energy-generating element 2, thereby conducting recording.

For example, when electrothermal conversion elements are used as the ink ejection-energy-generating elements 2, such an element heats an ink situated in the vicinity thereof, whereby a change of state is caused in the ink to generate ejection energy. When piezoelectric elements are used on the other hand, ejection energy is generated by the mechanical vibration of such an element.

An electrode (not illustrated) for inputting a control signal for operating each of these elements is connected to the element 2. Various functional layers such as a protective layer are generally provided for the purpose of improving the durability of these ejection-energy-generating elements. In the present invention, it may be absolutely allowed to provide such functional layers.

In FIG. 8A, is illustrated a form that an opening 3 for feeding an ink is provided in the substrate 1 in advance to feed the ink from the rear of the substrate 1. In the formation of the opening 3, any method may be used so far as it is a means for making a bore in the substrate 1. For example, the opening may be formed by a mechanical means such as a drill or with light energy such as laser. A resist pattern or the like may be formed on the substrate 1 to chemically etch the substrate.

It goes without saying that the opening 3 for feeding an ink may be formed in a resin pattern without forming it in the substrate 1 so as to provide it in the same surface as that of ink-ejection openings 8 opposite to the substrate 1.

As illustrated in FIG. 8A, an ink flow path pattern 4 is then formed with a soluble resin on the substrate 1 so as to cover the ink ejection-energy-generating elements 2. As the most common means, is mentioned a means for forming the pattern with a photosensitive material. However, the formation is feasible by a means such as a screen printing method. When the photosensitive material is used, a positive resist or a soluble modification type negative resist may be used because the ink flow path pattern is soluble.

As a process for forming a resist layer, it is preferable that the layer be formed by dissolving the photosensitive material in a proper solvent, applying the solution to a film formed of PET (polyethylene terephthalate) or the like, drying the coating film to form a dry film, and laminating the dry film on a substrate when the substrate provided with the opening for feeding an ink therein is used. As a material for forming the dry film, may be preferably used a vinyl ketone type photo-degradable high-molecular compound such as poly(methyl isopropyl ketone) or poly(vinyl ketone) because such a compound retains property (film-forming property) as a high-molecular compound before irradiation of light, and so it can also be easily laminated on the opening 3.

Alternatively, a filler capable of being removed in a subsequent step may be charged into the opening 3 to form a film by an ordinary spin coating method, roll coating method or the like.

Figure 8B:
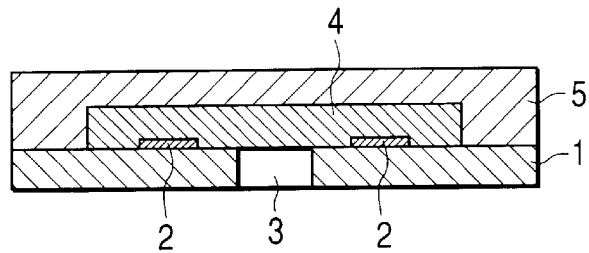

A coating resin layer 5 is formed on the soluble resin material layer 4, on which the ink flow path has been patterned as described above, by an ordinary spin coating method, roll coating method or the like as illustrated in FIG. 8B. In the step of forming the coating resin layer 5, it is necessary to take care that the soluble resin pattern is not deformed. More specifically, when a material for the coating resin layer 5 is dissolved in a solvent, and the solution is applied to the soluble resin pattern 4 by the spin coating method, roll coating method or the like to form the coating resin layer 5, it is necessary to select a solvent so as not to dissolve the soluble resin pattern 4.

Here, the coating resin layer 5 is described. As the material for the coating resin layer 5, is preferred a photosensitive material because ink-ejection openings, which will be described subsequently, may be formed with easy and good precision by photolithography. Such a photosensitive coating resin layer 5 is required to have high mechanical strength, adhesion to the substrate 1 and ink resistance as a structural material and at the same time sufficient resolution to pattern a minute patter of ink-ejection openings. It has been found that a cured product of an epoxy resin by cationic polymerization has excellent strength, adhesion and ink resistance as a structural material, and excellent patterning property so far as the epoxy resin is solid at normal temperature.

Since the cured product of the epoxy resin by cationic polymerization has a high crosslink density (high Tg) compared with an ordinary cured product by an acid anhydride or amine, it exhibits excellent properties as a structural material. In addition, an epoxy resin, which is solid at normal temperature, is used, whereby a polymerization initiation species generated from a cationic polymerization initiator by irradiation of light is prevented from diffusing into the epoxy resin, and so excellent patterning precision and form can be achieved.

The formation of the coating resin layer on the soluble resin layer is desirably conducted by a process comprising dissolving a coating resin, which is solid at normal temperature, in a solvent and applying the solution to the soluble resin layer by a spin coating method.

The spin coating method, which is a technique for applying a thin film, is used, whereby the coating resin layer 5 can be formed uniformly and with good precision, a distance (OH distance) between the ink ejection-energy-generating element 2 and an orifice can be shortened, which has been difficult by any conventional method, and ejection of minute droplets can be achieved with ease.

When the so-called negative photosensitive material described above is used as a coating resin, reflection from the surface of the substrate and scum (residue after development) generally occur. In the present invention, however, the ejection opening pattern is formed on the ink flow path formed with the soluble resin, and so the influence of the reflection from the substrate can be neglected, and the scum generated upon development is lifted off in a step of washing out the soluble resin forming the ink flow path, which will be described subsequently, and so any adverse influence is not exerted.

Examples of the solid epoxy resin used in the present invention include reaction products of bisphenol A and epichlorohydrin, which have a molecular weight of about 900 or higher, reaction products of bromine-containing bisphenol A and epichlorohydrin, reaction product of phenol novolak or o-cresol novolak and epichlorohydrin, polyfunctional epoxy resins having an oxycyclohexane skeleton described in Japanese Patent Application Laid-Open Nos. 60-161973, 63-221121, 64-9216 and 2-140219. It goes without saying that the present invention is not limited to these resins.

Examples of a photo-induced cationic polymerization initiator for curing the epoxy resin include aromatic iodonium salts, aromatic sulfonium salts (see J. POLYMER SCI: Symposium No. 56, 383–395 (1976)), and SP-150 and SP-170 marketed from Asahi Denka kogyo K.K.

The photo-induced cationic polymerization initiator may be used in combination with a reducing agent and heated, thereby facilitating cationic polymerization (crosslink density is improved compared with simple photo-induced cationic polymerization). When the photo-induced cationic polymerization initiator is used in combination with the reducing agent, however, it is necessary to select a reducing agent so as to give the so-called redox type initiator system by which the reaction does not take place at normal temperature, but occurs at a certain temperature or higher (preferably 60° C. or higher).

As such a reducing agent, a copper compound, particularly copper triflate (copper(II)trifluoromethanesulfonate) is most suitable taking reactivity and solubility in the epoxy resin into consideration. A reducing agent such as ascorbic acid may also be useful. When a higher crosslink density (higher Tg) is required for increase in the number of nozzles (high-speed printability) and use of a non-neutral ink (improvement in water resistance of a coloring material), the crosslink density can be raised by a post step in which the reducing agent is used in the form of a solution after the step of developing the coating resin layer as described below to immerse the coating resin layer therein and heat it.

To the above-described composition, additives and/or the like may be suitably added as needed. For example, a flexibility-imparting agent is added for the purpose of lowering the elastic modulus of the epoxy resin, or a silane coupling agent is added for the purpose of further enhancing the adhesion to the substrate.

Figure 8C:
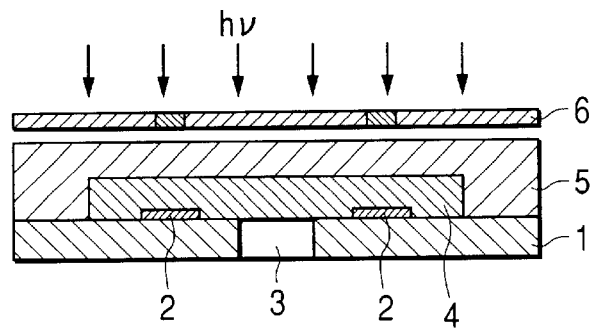

As illustrated in FIG. 8C, the photosensitive coating resin layer 5 formed of the above-described compound is then subjected to patterning exposure through a mask 6. The photosensitive coating resin layer 5 is negative, and so portions for forming the ink-ejection openings are shielded with the mask (of course, portions for conducting electric connection are also shielded. Not illustrated).

The patterning exposure may be conducted with ultraviolet rays, deep ultraviolet rays, electron beam, X-rays or the like, which is suitably selected according to the photosensitive region of the photo-induced cationic polymerization initiator used.

In all the steps described above, alignment may be made by using the conventional lithographic technique. Therefore, precision may be enhanced to a marked extent compared with a method in which an orifice plate is separately prepared and laminated on a substrate. The photosensitive coating resin layer 5 thus subjected to the patterning exposure may be subjected to a heat treatment for the purpose of facilitating the reaction as needed. As described above, the photosensitive coating resin layer is formed of the epoxy resin which is solid at normal temperature. Therefore, the diffusion of a polymerization initiation species generated by the patterning exposure is restricted, and so excellent patterning precision and form can be realized.

Figure 8D:
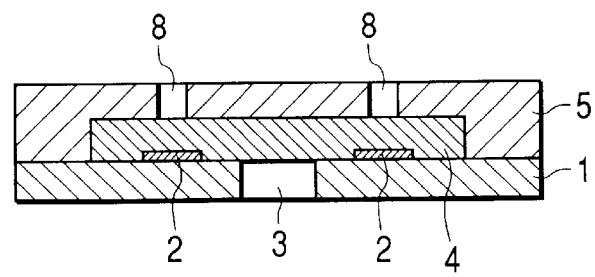

The photosensitive coating resin layer 5 subjected to the patterning exposure is then developed with a proper solvent to form ink-ejection opening 8 as illustrated in FIG. 8D. At the same time as the development of the unexposed photosensitive coating resin layer, the soluble resin pattern 4 forming the ink flow path may also be developed.

Figure 8E:
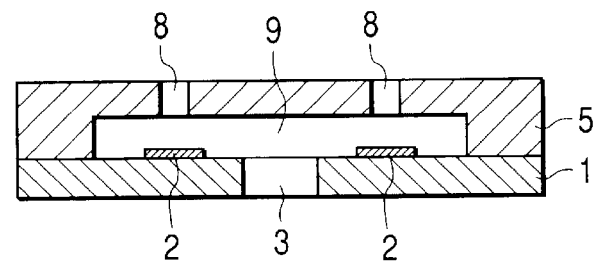

However, since a plurality of the same or different heads are generally arranged on the substrate 1, and they are separately used as ink-jet liquid-ejecting heads through a cutting step, only the photosensitive coating resin layer 5 may be selectively developed as illustrated in FIG. 8D as a countermeasure against dust, thereby leaving the resin pattern 4 forming an ink flow path 9 (dust generated in the cutting step is not penetrated because the resin pattern remains undeveloped in a liquid chamber) to develop the resin pattern after conducting the cutting step (see FIG. 8E). At this time, scum (residue after development) generated upon the development of the photosensitive coating resin layer 5 is dissolved out together with the soluble resin layer 4. Therefore, no residue is lifted within the nozzle.

When the crosslink density must be raised as described above, the photosensitive coating resin layer 5, in which the ink flow path 9 and ink-ejection openings 8 have been formed, is immersed in a solution containing the reducing agent and heated, thereby conducting post cure. By this treatment, the crosslink density of the photosensitive coating resin layer 5 is further raised, and adhesion to the substrate and ink resistance are very improved.

The step of immersing the resin layer in the copper ion-containing solution and heating it may be safely conducted right after forming the ink-ejection opening 8 by subjecting the photosensitive coating resin layer 5 to the patterning exposure and developing it. The soluble resin pattern 4 may be safely dissolved out thereafter. In the immersing and heating step, the heating may be conducted while immersing the resin layer, or the heat testament may be conducted after the immersion.

As such a reducing agent, any substance is useful so far as it has a reducing action. However, a copper ion-containing compound such as copper triflate, copper acetate or copper benzoate is particularly effective. Among the above compounds, particularly, copper triflate exhibits a very high effect. Besides the above compounds, ascorbic acid may also be useful.

Figure 8F:
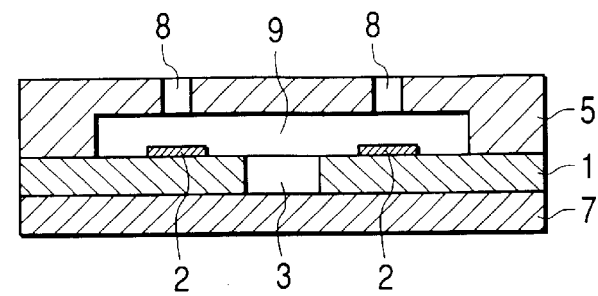

To the substrate having the ink flow path and ink-ejection openings thus formed, a member 7 for feeding an ink is bonded, electrical connection for driving the ink ejection-energy-generating elements 2 is made (not illustrated), thereby forming an ink-jet liquid-ejecting head (see FIG. 8F).

In this production example, the formation of the ink-ejection openings 8 is conducted by photolithography. However, the present invention is not limited thereto, and the ink-ejection openings 8 may be formed by dry etching with oxygen plasma, or excimer laser by changing the mask. When the ink-ejection openings 8 are formed by excimer laser or dry etching, a head having high precision and reliability may be provided because the substrate is protected with a resin pattern and not damaged by the laser or plasma. In addition, when the ink-ejection openings 8 are formed by dry etching or excimer laser, a thermosetting resin may be applied to the coating resin layer 5 in addition to the photosensitive resin.

Figure 9:
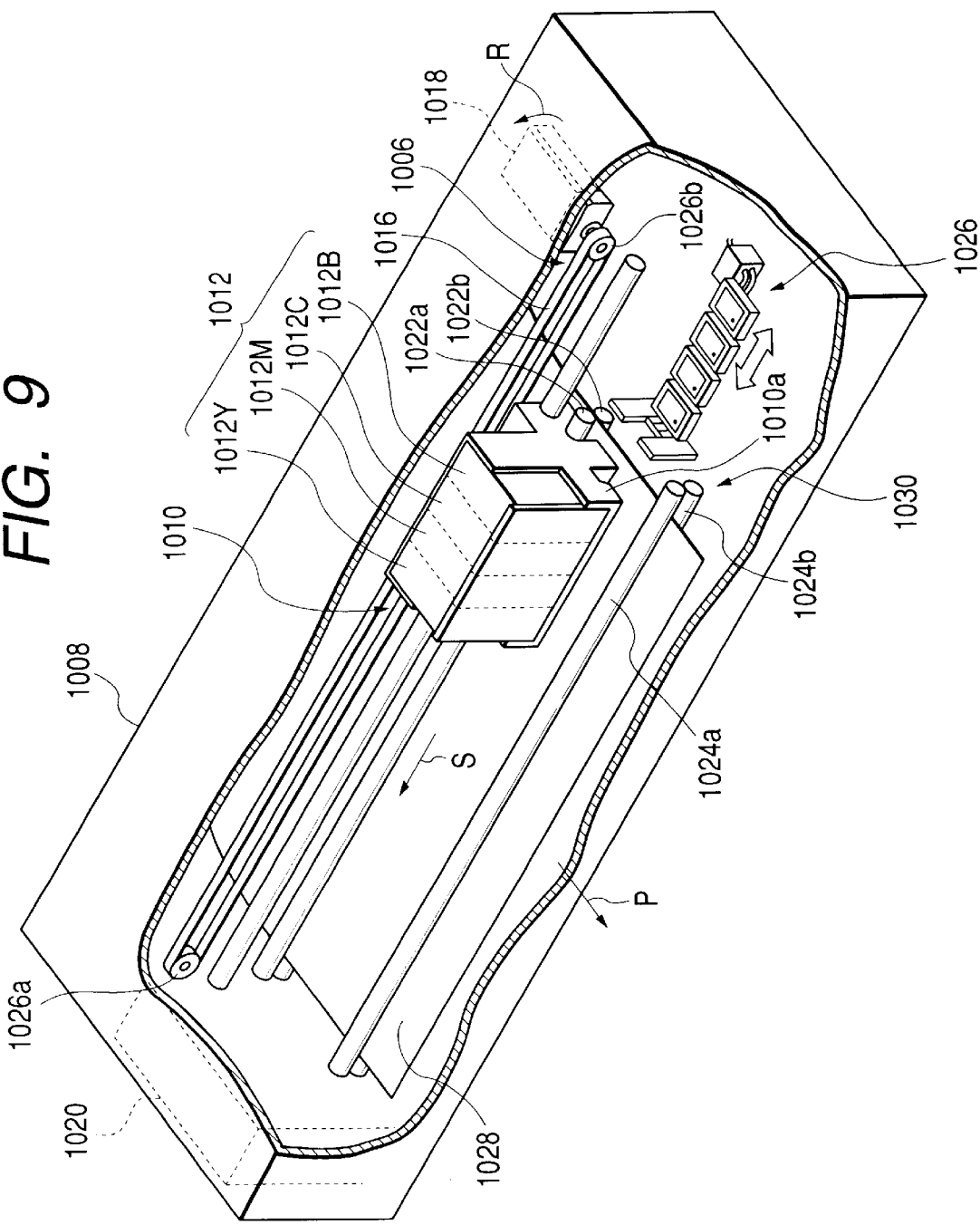
FIG. 9 is a schematic perspective view illustrating principal parts in an exemplary ink-jet printer capable of installing a liquid-ejecting head.

Other specific examples of the recording apparatus and recording heads preferably used in the present invention will hereinafter be described. FIG. 9 is a schematic perspective view illustrating principal parts of a liquid-ejecting head of an ejection system that a bubble communicates with the air upon ejection, and an exemplary ink-jet printer as a liquid-ejecting apparatus using this head.

In FIG. 9, the ink-jet printer comprises a conveying device 1030 for intermittently conveying paper 1028 as a recording medium provided along the longitudinal direction in a casing 1008 in a direction shown by an arrow P in FIG. 9, a recording part 1010 reciprocatingly moved in a direction substantially parallel to a direction S substantially perpendicular to the conveying direction P of the paper 1028 by the conveying device 1030, and a driving part 1006 for movement as a driving means for reciprocatingly moving the recording part 1010.

The driving part 1006 for movement comprises a belt 1016 wound around pulleys 1026a and 1026b respectively provided on rotating shafts oppositely arranged at a prescribed interval and a motor 1018 for driving the belt 1016 joined to a carriage member 1010a of the recording part 1010 arranged in substantial parallel to roller units 1022a and 1022b in forward and reverse directions.

When the motor 1018 is operated to rotate the belt 1016 in a direction shown by an arrow R in FIG. 9, the carriage member 1010a of the recording part 1010 is moved by the prescribed movement in the direction shown by the arrow S in FIG. 9. When the motor 1018 is operated to rotate the belt 1016 in a direction reverse to the direction shown by the arrow R in FIG. 9, the carriage member 1010a of the recording part 1010 is moved by the prescribed movement in a direction reverse to the direction shown by the arrow S in FIG. 9. At an end of the driving part 1006 for movement, a recovery unit 1026 for conducting an ejection-recovery treatment for the recording part 1010 is provided in opposed relation to an array of ink-ejection openings of the recording part 1010 at the home position of the carriage member 1010a.

In the recording part 1010, ink-jet cartridges (hereinafter may be referred merely to as "cartridges" in some cases) 1012Y, 1012M, 1012C and 1012B for respective colors, for example, yellow, magenta, cyan and black, are detachably mounted on a carriage member 1010a.

Figure 10:
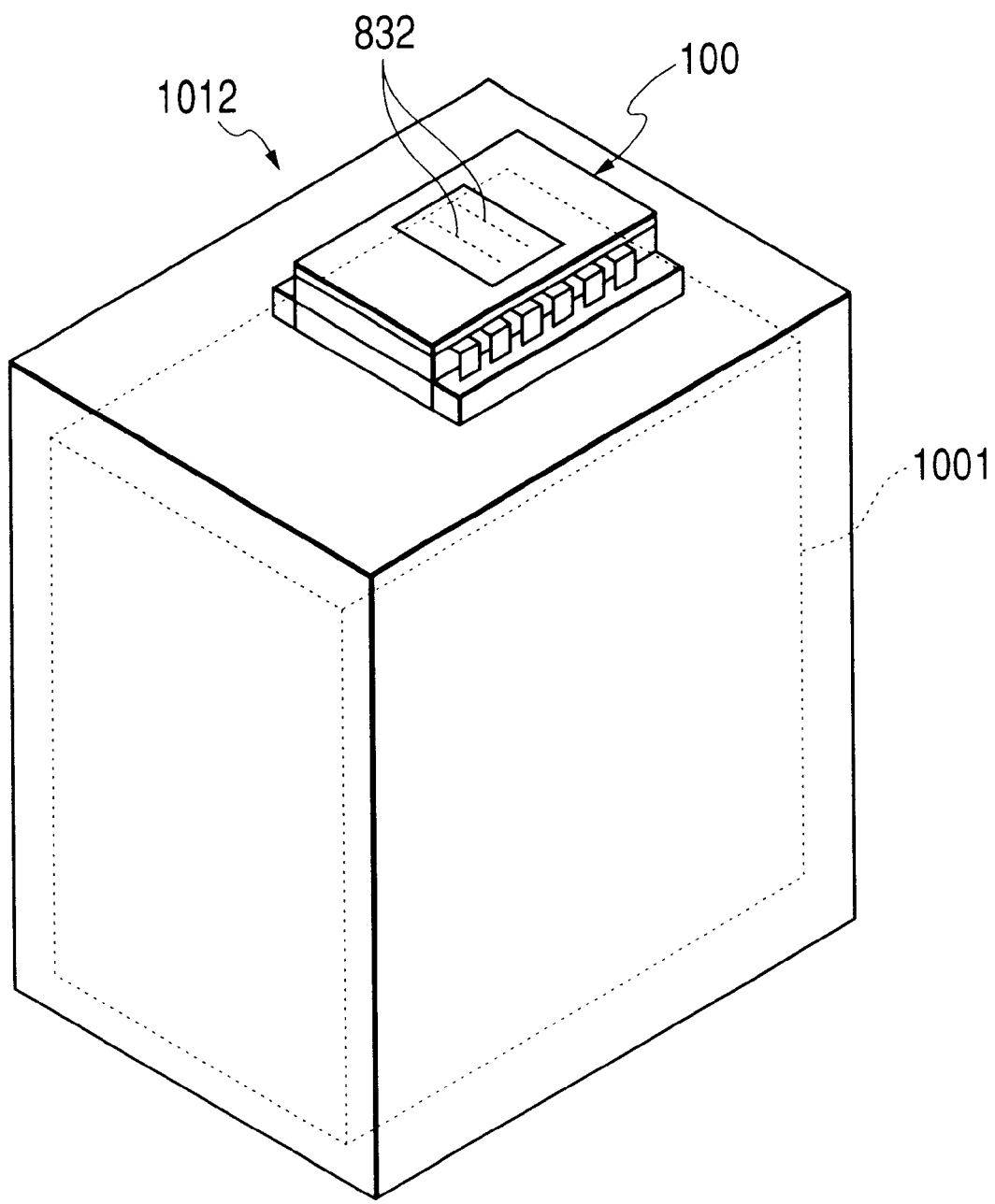
FIG. 10 is a schematic perspective view illustrating an exemplary ink-jet cartridge equipped with the liquid-ejecting head.

FIG. 10 illustrates an exemplary ink-jet cartridge capable of being mounted on the above-described ink-jet recording apparatus. The cartridge 1012 in this embodiment is of a serial type, and its principal part is constructed by an ink-jet recording head 100 and a liquid tank for containing a liquid such as an ink.

In the ink-jet recording head 100, a great number of ejection openings 832 for ejecting the liquid is formed, and the liquid such as an ink is directed to a common liquid chamber (see FIG. 11) in the liquid-ejecting head 100 through a liquid feed passage (not illustrated) from the liquid tank 1001. The cartridge 1012 is so constructed that the ink-jet recording head 100 and the liquid tank 1001 are integrally formed, and the liquid can be supplied to the interior of the liquid tank 1001 as needed. However, a structure that the liquid tank 1001 is replaceably joined to this liquid-ejecting head 100 may also be adopted.

A specific example of the above-described liquid-ejecting head capable of being mounted on the ink-jet printer of such a construction will hereinafter be described in detail.

Figure 11:
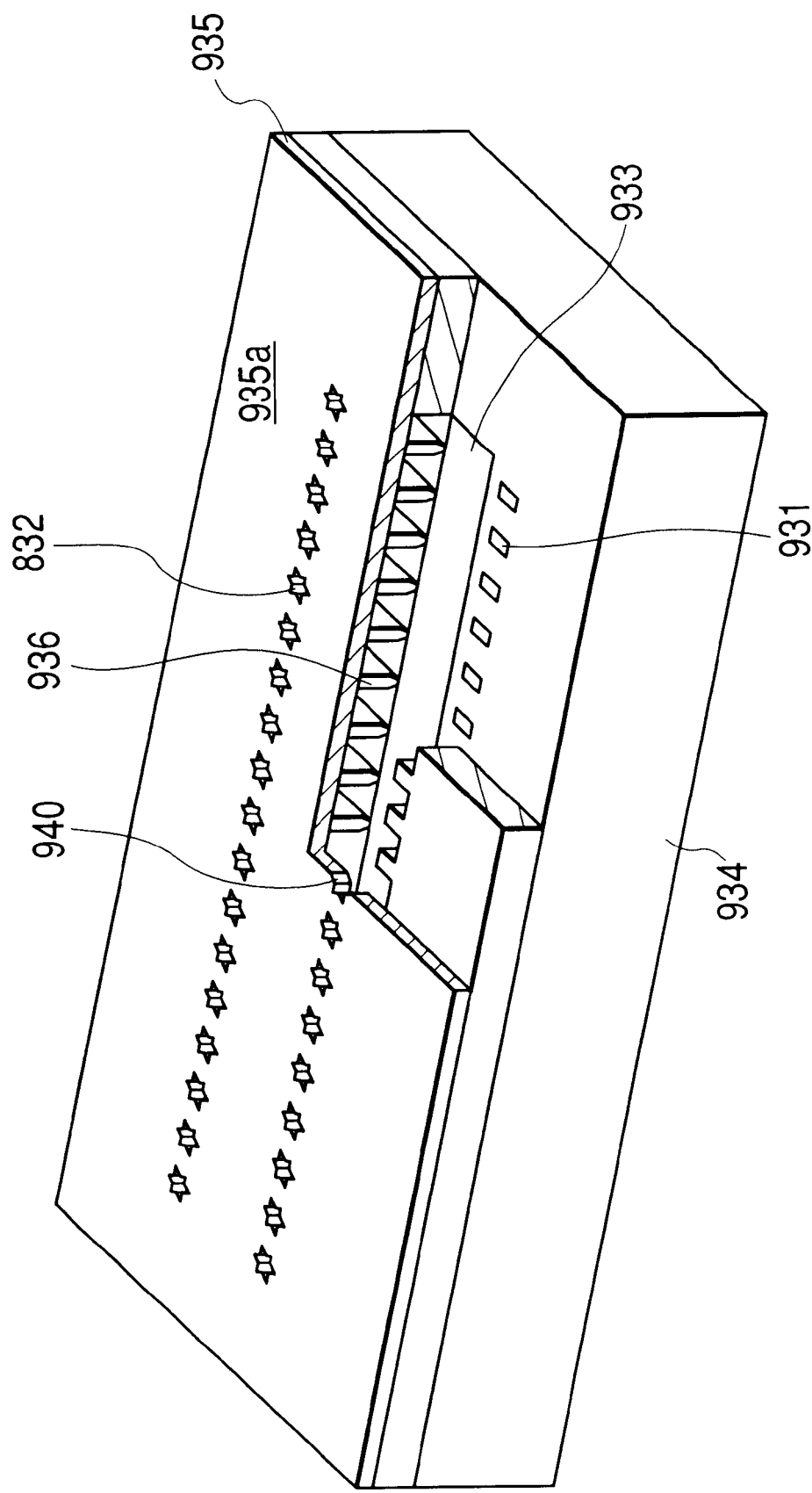
FIG. 11 is a schematic perspective view typically illustrating principal parts of an exemplary liquid-ejecting head.

FIG. 11 is a schematic perspective view typically illustrating principal parts of a liquid-ejecting head showing the basic form of the present invention, and FIGS. 12 to 15 are front views illustrating the form of ejection openings of the liquid-ejecting head shown in FIG. 11. Incidentally, electrical wiring and the like for driving electrothermal conversion elements are omitted.

In the liquid-ejecting head according to this embodiment, such a substrate 934 composed of glass, ceramic, plastic or metal as illustrated in, for example, FIG. 11 is used. The material of such a substrate is not essential to the present invention and is not particularly limited so far as it functions as a part of a flow-path forming member and as a support for an ink ejection-energy-generating element, and a material layer for forming a liquid flow path and ejection openings, which will be described subsequently. Therefore, in this embodiment, the description is given in the case where an Si substrate (wafer) is used. The ejection openings can be formed in accordance with not only a forming process by laser beam, but also, for example, a process in which a photosensitive resin is used as an orifice plate (ejection-opening plate) 935, which will be described subsequently, to form ejection openings by an aligner such as MPA (mirror projection aligner).

In FIG. 11, reference numeral 934 indicates a substrate equipped with electrothermal conversion elements (hereinafter may be referred as "heater" in some cases) 931 and an ink feed opening 933 formed of a long-grooved through-opening as a common liquid chamber. The heaters 931, which are thermal energy-generating means, are arranged in a zigzag form in a row on both sides of the ink feed opening 933 along the longitudinal direction thereof with an interval of, for example, 300 dpi between the electrothermal conversion elements. Walls 936 for ink flow path for forming ink flow paths are provided on the substrate 934. Further, an ejection-opening plate 935 equipped with ejection openings 832 is provided on the walls 936 for ink flow path.

In FIG. 11, the walls 936 for ink flow path and the ejection-opening plate 935 are illustrated as separate members. However, the walls 936 for ink flow path may be formed on the substrate 934 by a method such as spin coating, thereby forming the walls 936 for ink flow path and the ejection-opening plate 935 as the same member at the same time. In this embodiment, the side of the ejection-opening face (upper surface) 935a is subjected to a water-repellent treatment.

In this embodiment, a head of the serial type that recording is conducted while scanning in the direction shown by the arrow S in FIG. 9 is used to conduct recording at, for example, 1,200 dpi. Driving frequency is 10 kHz, and ejection is conducted at the shortest time interval of 100 $\mu$s in one ejection opening.

Figure 12:
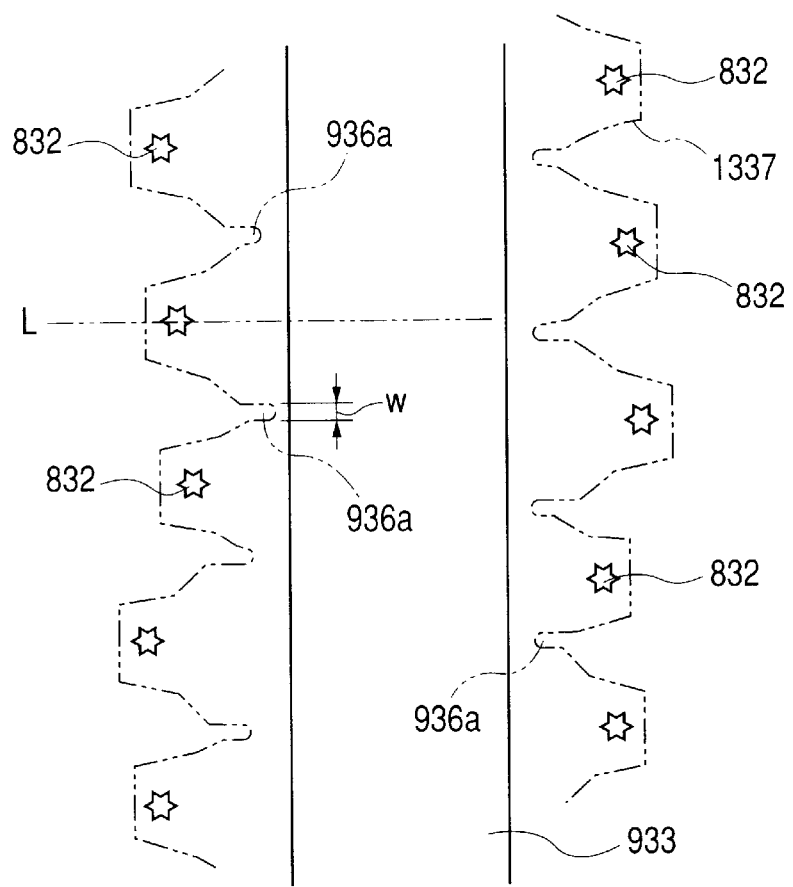
FIG. 12 is a conceptual view illustrating a part extracted from the exemplary liquid-ejecting head.
Figure 15:
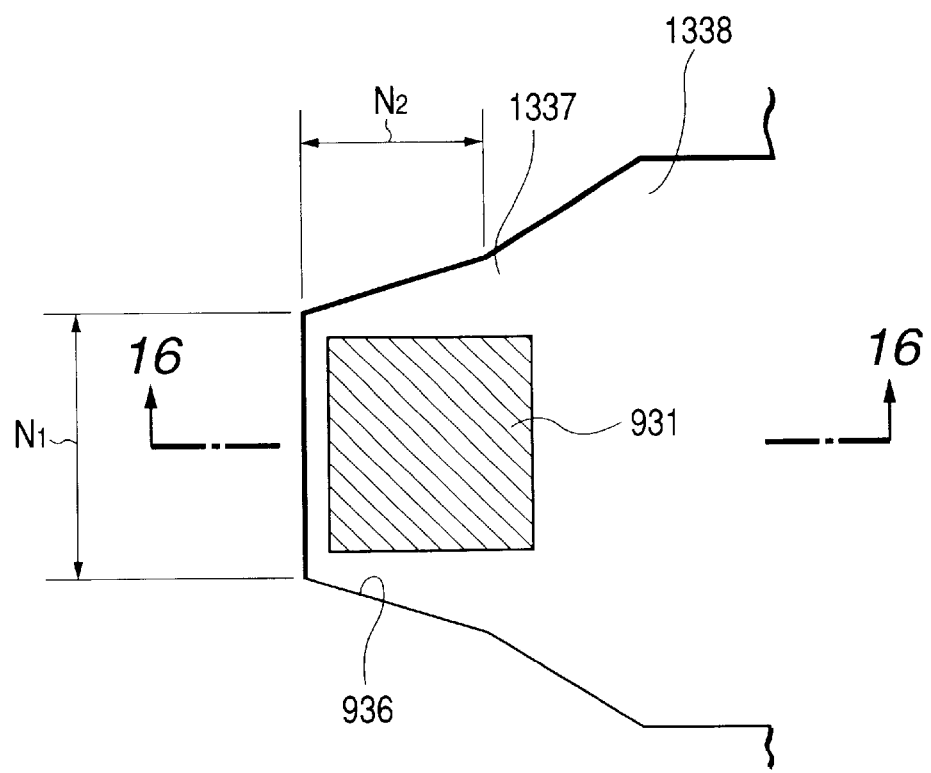
FIG. 15 typically illustrates a principal part in FIG. 12.

As an example of dimensions of the head, a partition wall 936a for isolating adjacent nozzles from each other from the viewpoint of fluid has a width w of 14 $\mu$m as illustrated in, for example, FIG. 12. As illustrated in FIG. 15, a bubbling chamber 1337 formed by the walls 936 for ink flow path has $N_1$ (width of the bubbling chamber) of 33 $\mu$m and $N_2$ (length of the bubbling chamber) of 35 $\mu$m. The size of the heater 931 is 30 $\mu$m×30 $\mu$m, the resistance value of the heater is 53Ω, and driving voltage is 10.3 V. A head in which the heights of the wall 936 for ink flow path and the partition wall 936a are 12 $\mu$m, and the thickness of the ejection-opening plate is 11 $\mu$m may be used.

In the section of an ejection opening part 940 provided in the ejection-opening plate including ejection openings 832, the form of a section taken along a direction intersecting the ejecting direction (thickness-wise direction of the orifice plate 935) of the ink is a substantially star form and is generally formed by 6 projected portions 832a having a corner of an obtuse angle and 6 recessed portions 832b alternately arranged between these projected portions 832a and having a corner of an acute angle. More specifically, 6 grooves are formed in the thickness-wise direction (ejecting direction of the liquid) of the orifice plate shown in FIG. 11 by using the recessed portion 832b locally distant from the center O of the ejection opening as a top thereof and the projected portion 832a adjacent to this region and locally near from the center O of the ejection opening as a base (see 1141a in FIG. 16 as to the position of the groove).

Figure 13:
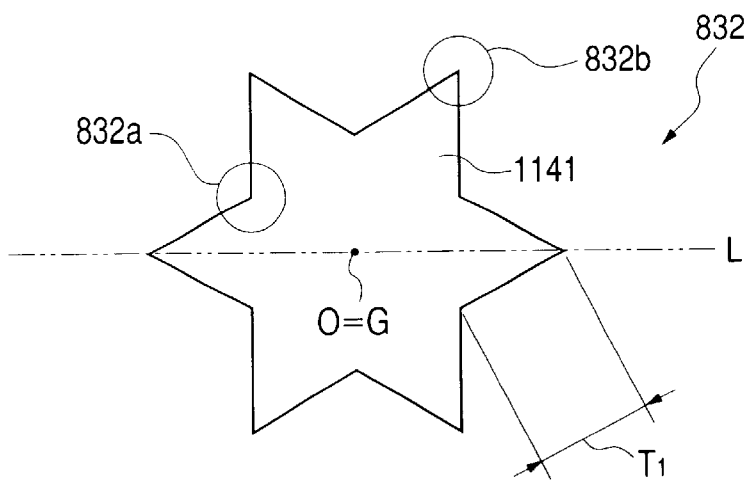
FIG. 13 is an enlarged view illustrating a part of the ejection openings shown in FIG. 12.

In this embodiment, the ejection opening part 940 is such that, for example, a section taken along a direction intersecting the thickness-wise direction thereof is in a form with 2 equilateral triangle having a side of 27 $\mu$m combined with each other in a state that one of them has been turned by 60 degrees. $T_1$ shown in FIG. 13 is 8 $\mu$m. The angles of the projected portions 832a are all 120 degrees, while the angles of the recessed portions 832b are all 60 degrees.

Accordingly, the center O of the ejection opening consists with the center of gravity G of a polygon formed by connecting centers (center (center of gravity) of a figure formed by connecting the top of the groove and 2 bases adjacent to the top) of the grooves adjacent to each other. The opening area of the ejection opening 832 in this embodiment is 400 $\mu$m$^2$, and the opening area (area of the figure formed by connecting the top of the groove and two bases adjacent to the top) of the groove is about 33 $\mu$m$^2$ per groove.

Figure 14:
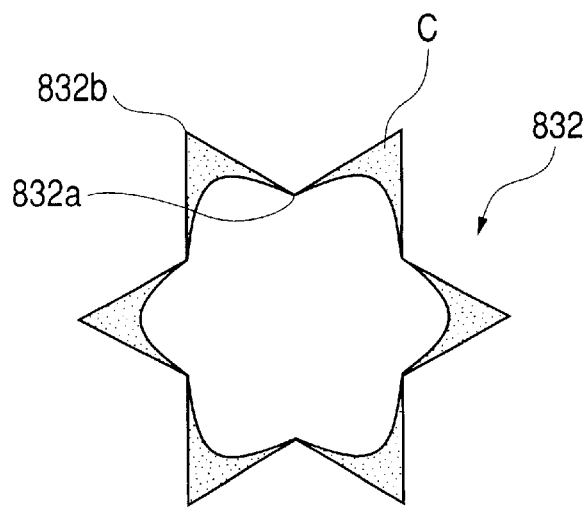
FIG. 14 typically illustrates a state that an ink has attached to the ejection opening portion shown in FIG. 13.

FIG. 14 is a typical drawing illustrating a state that an ink has attached to the ejection opening portion shown in FIG. 13, and reference character C indicates a portion to which the ink has attached.

An ejecting operation of a liquid by the ink-jet recording head of the above-described construction will hereinafter be described with reference to FIGS. 16 to 23.

FIGS. 16 to 23 are cross-sectional views; for illustrating the ejecting operation of a liquid by the liquid-ejecting head shown in FIGS. 11 to 15 and are cross-sectional views of the bubbling chamber 1337 shown in FIG. 15 taken along line 16—16. In this section, an end of the ejection opening part 940 in the thickness-wise direction of the orifice plate is the top 1141a of a groove 1141.

Figure 16:
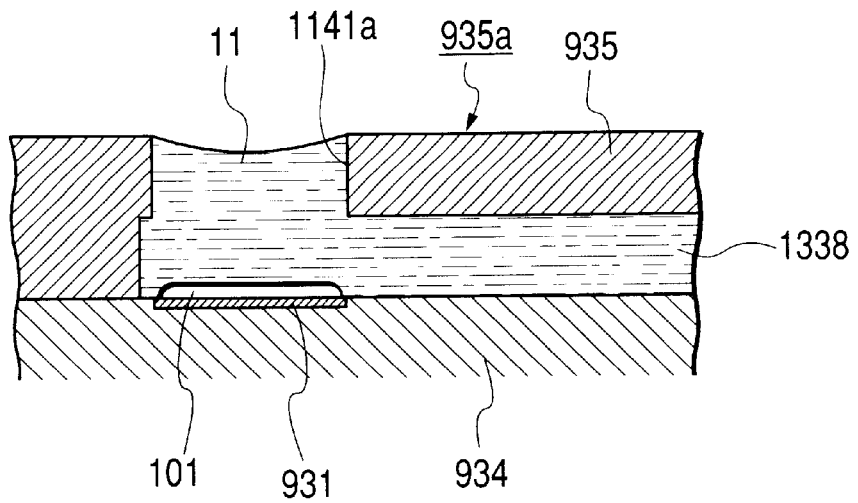
FIG. 16 is a schematic cross-sectional view corresponding to a 16—16 cross-sectional form in FIG. 15 and illustrating an ejecting operation of a liquid in the liquid-ejecting head with time together with FIGS. 17 to 23.

FIG. 16 illustrates a state that a film-like bubble has been formed on the heater, and FIGS. 17, 18, 19, 20, 21, 22 and 23 illustrate states after about 1 $\mu$s from the state in FIG. 16, after about 2 $\mu$s from the state in FIG. 16, after about 3 $\mu$s from the state in FIG. 16, after about 4 $\mu$s from the state in FIG. 16, after about 5 $\mu$s from the state in FIG. 16, after about 6 $\mu$s from the state in FIG. 16 and after about 7 $\mu$s from the state in FIG. 16, respectively. Incidentally, in the following description, "drop" or "drop-in" does not mean drop in the so-called gravity direction, but means the movement in the direction of an electrothermal conversion element irrespective of the installing direction of a head.

Figure 17:
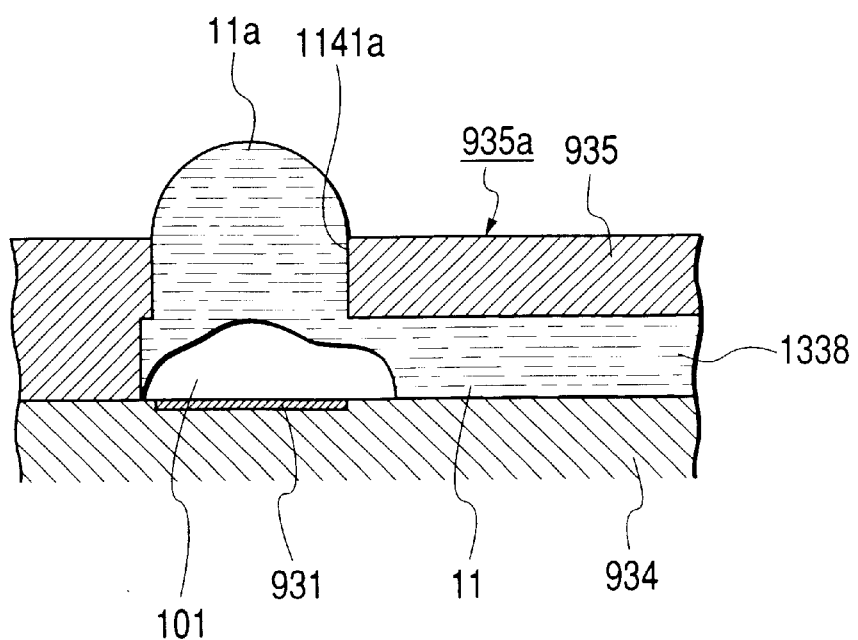
FIG. 17 is a schematic cross-sectional view corresponding to the 16—16 perspective sectional form in FIG. 15 and illustrating an ejecting operation of the liquid in the liquid-ejecting head with time together with FIGS. 16 and 18 to 23.
Figure 18:
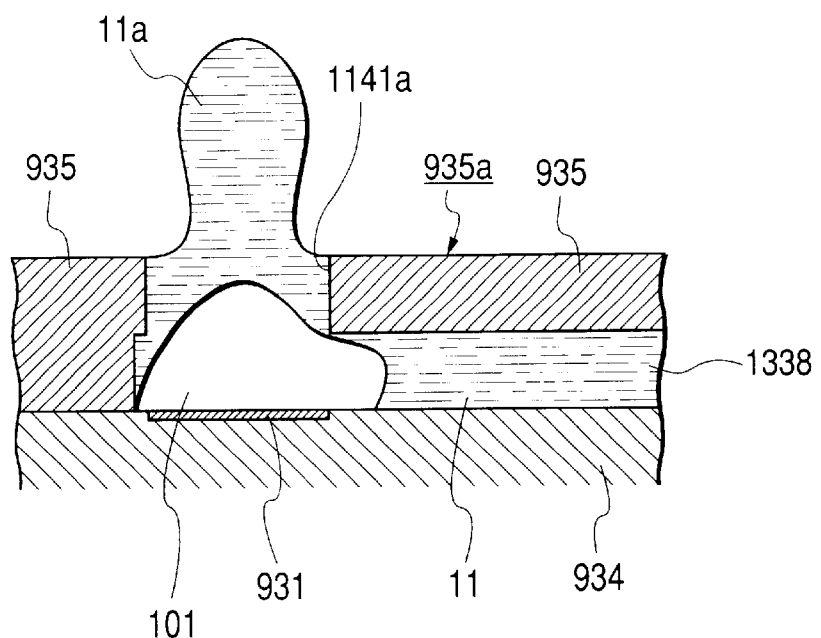
FIG. 18 is a schematic cross-sectional view corresponding to the 16—16 cross-sectional form in FIG. 15 and illustrating an ejecting operation of the liquid in the liquid-ejecting head with time together with FIGS. 16, 17 and 19 to 22.

When a bubble 101 is first formed in a liquid flow path 1338 on a heater 931 by energizing the heater 931 on the basis of a recording signal or the like as illustrated in FIG. 16, the bubble quickly volumetrically expands and grows during about 2 $\mu$s as illustrated in FIGS. 17 and 18. The height of the bubble 101 in the greatest volume exceeds the face 935a of an ejection opening. At this time, the pressure of the bubble decreases from one to several to one to ten and several as high as the atmospheric pressure.

Figure 19:
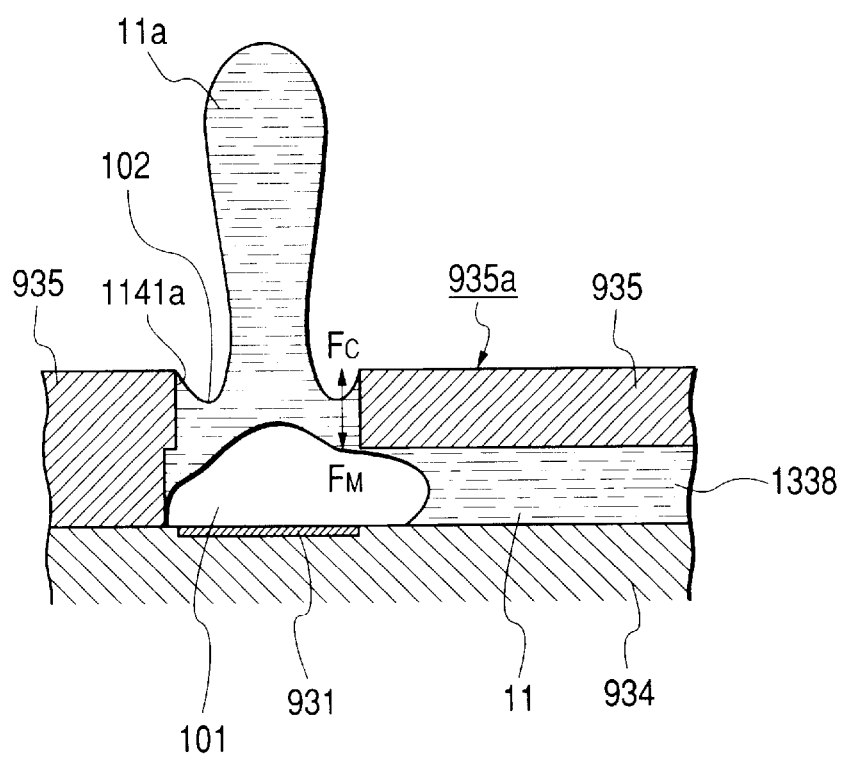
FIG. 19 is a schematic cross-sectional view corresponding to the 16—16 cross-sectional form in FIG. 15 in the liquid-ejecting head and illustrating an ejecting operation of the liquid in the liquid-ejecting head with time together with FIGS. 16 to 18 and 20 to 23.

At the time about 2 $\mu$s have elapsed from the formation of the bubble, the volume of the bubble 101 turns from the greatest volume to decreased volume as described above, and at substantially the same time as this, the formation of a meniscus 102 is started. The meniscus 102 also recedes, i.e., drops in the direction of the heater 931 as illustrated in FIG. 19.

In this embodiment, the ejection opening part has a plurality of grooves 1141 in a dispersed state, whereby capillary force acts in an opposite direction $F_C$ to the receding direction $F_M$ of the meniscus at the portion of the groove 1141 when the meniscus 102 recedes. As a result, the forms of the meniscus and a main droplet (hereinafter may be referred to as "liquid" or "ink" in some cases) 11a when the meniscus recedes are compensated so as to give substantially symmetrical forms to the center of the ejection opening even if some variation is observed in the state of the bubble 101 by some cause.

Figure 20:
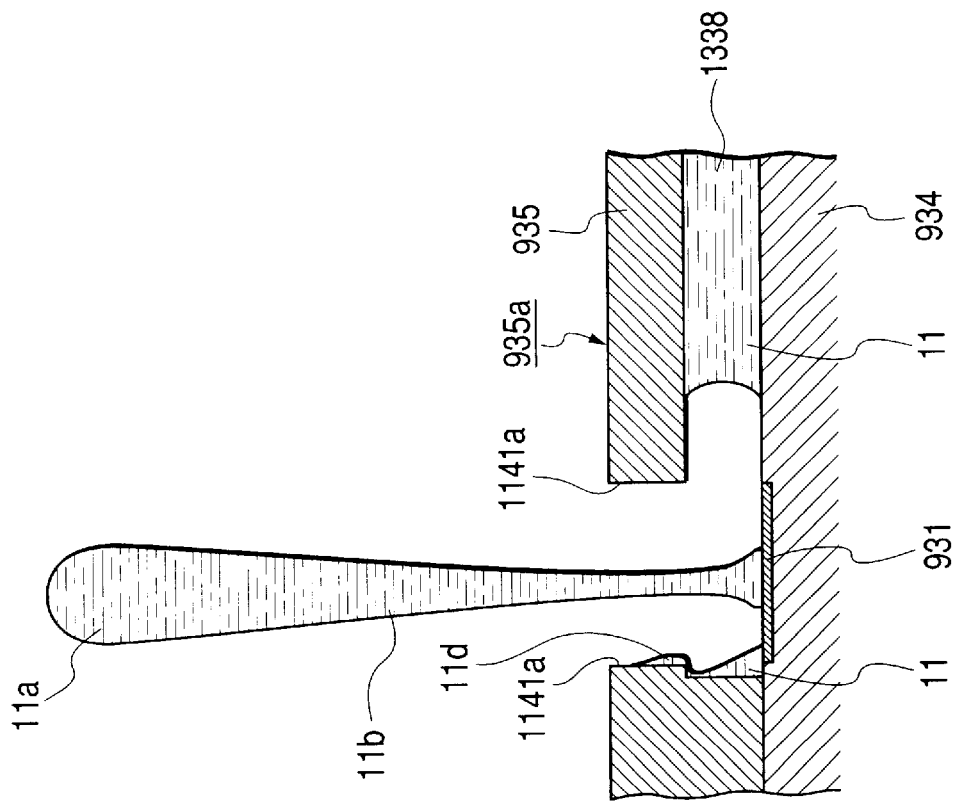
FIG. 20 is a schematic cross-sectional view corresponding to the 16—16 cross-sectional form in FIG. 15 and illustrating an ejecting operation of the liquid in the liquid-ejecting head with time together with FIGS. 16 to 19 and 21 to 23.

In this embodiment, the dropping velocity of this meniscus 102 is faster than the contracting velocity of the bubble 101, so that the bubble 101 communicates with the air in the vicinity of the lower surface of the ejection opening 832 at the time about 4 μs have elapsed from the formation of the bubble as illustrated in FIG. 20. At this time, the liquid (ink) in the vicinity of the central axis of the ejection opening 832 drops toward the heater 931, because the liquid (ink) 11a pulled back on the side of the heater 931 by the negative pressure of the bubble 101 before the communication with the air retains the velocity in the direction toward the heater 931 by virtue of inertia even after the communication with the air.

Figure 21:
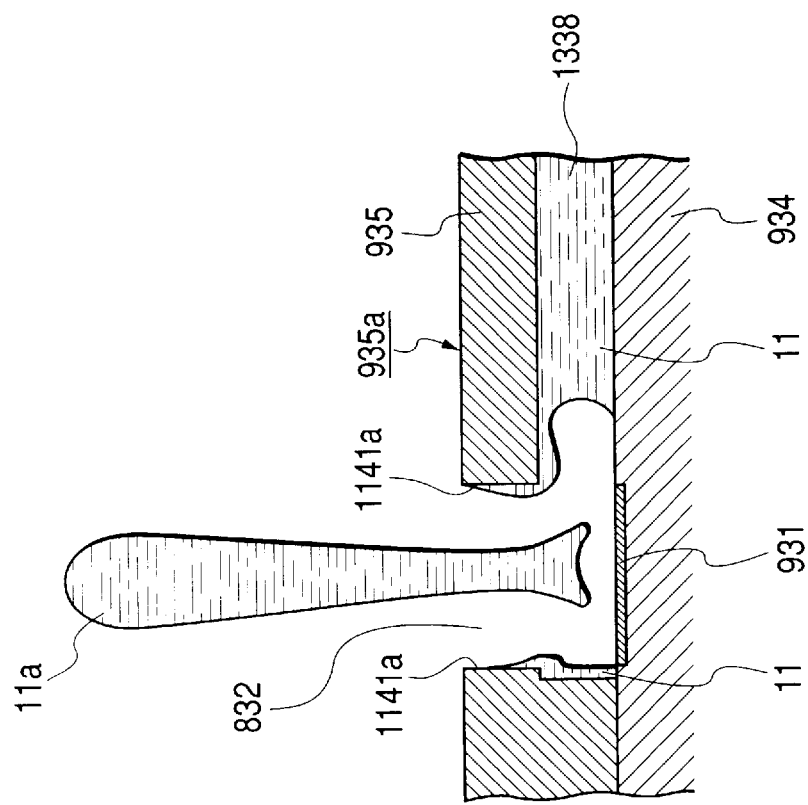
FIG. 21 is a schematic cross-sectional view corresponding to the 16—16 cross-sectional form in FIG. 15 and illustrating an ejecting operation of the liquid in the liquid-ejecting head with time together with FIGS. 16 to 20, 22 and 23.
Figure 22:
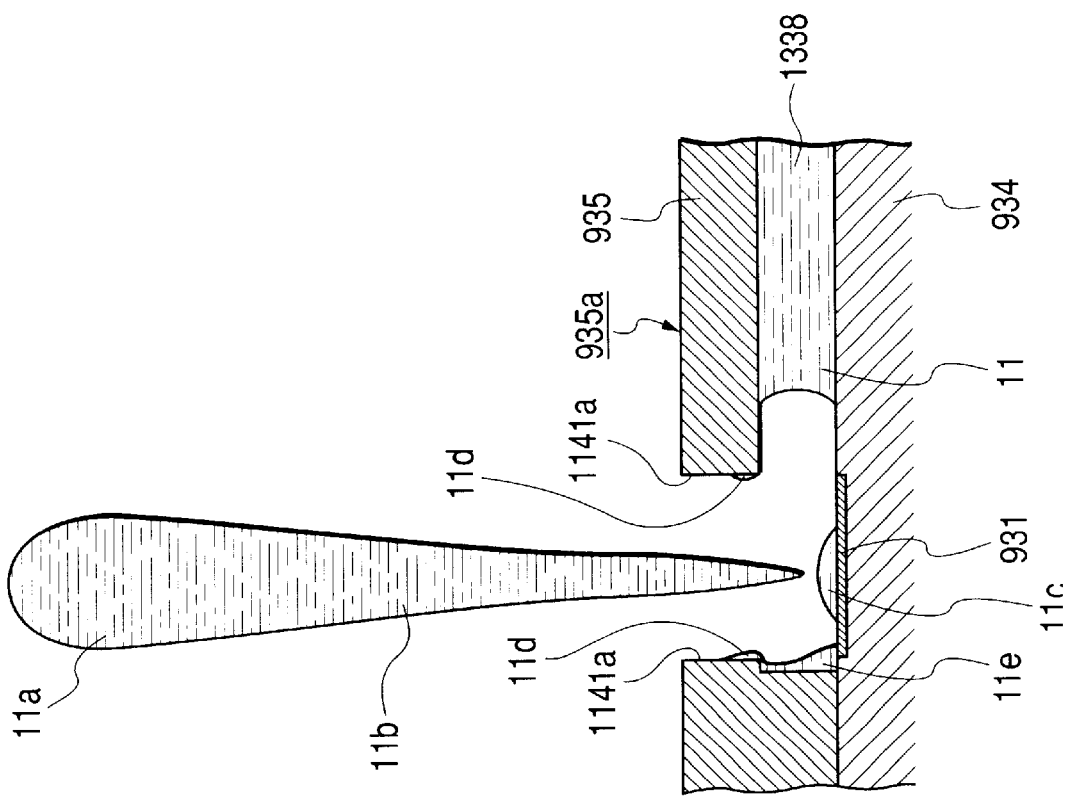
FIG. 22 is a schematic cross-sectional view corresponding to the 16—16 cross-sectional form in FIG. 15 and illustrating an ejecting operation of the liquid in the liquid-ejecting head with time together with FIGS. 16 to 21 and 23.

The liquid (ink) dropped toward the side of the heater 931 reaches the surface of the heater 931 at the time about 5 μs have elapsed from the formation of the bubble as illustrated in FIG. 21, and spreads so as to cover the surface of the heater 931 as illustrated in FIG. 22. The liquid spread so as to cover the surface of the heater 931 as described above has a vector in a horizontal direction along the surface of the heater 931. However, a vector in a direction intersecting the surface of the heater 931, for example, vertical direction vanishes, so that the liquid intends to remain on the surface of the heater 931, thereby pulling a liquid located on the upper side than such a liquid, i.e., a liquid keeping a velocity vector in the ejecting direction, downward.

Figure 23:
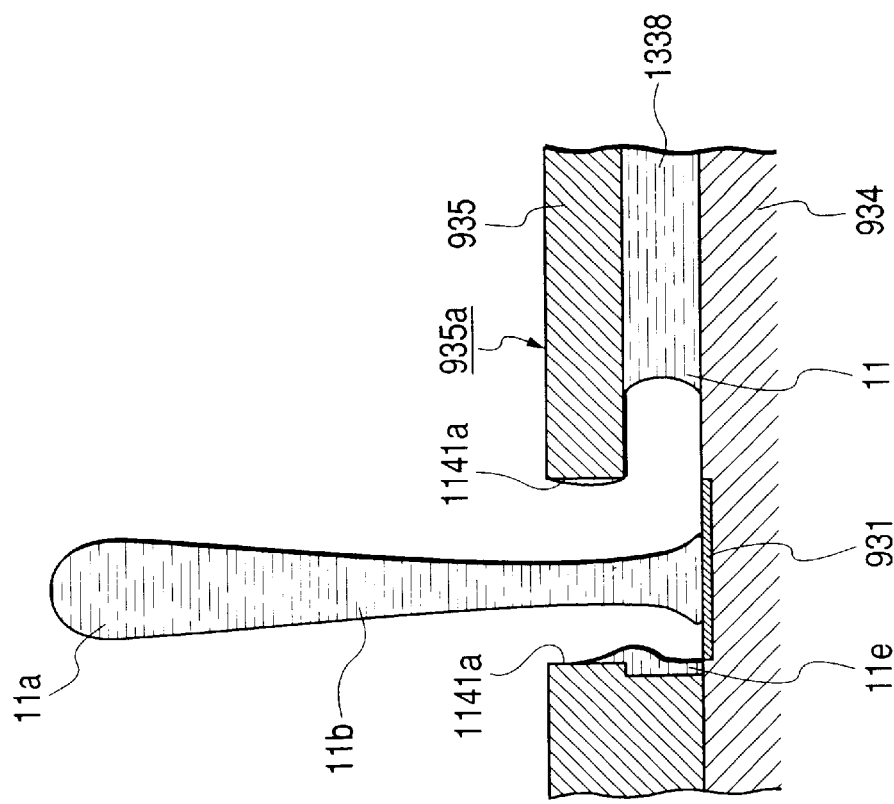
FIG. 23 is a schematic cross-sectional view corresponding to the 16—16 cross-sectional form in FIG. 15 and illustrating an ejecting operation of the liquid in the liquid-ejecting head with time together with FIGS. 16 to 22.

Thereafter, a liquid portion 11b between the liquid spread on the surface of the heater 931 and the liquid (main droplet) located on the upper side becomes thin, and is broken in the center of the surface of the heater 931 at the time about 7 μs have elapsed from the formation of the bubble as illustrated in FIG. 23, whereby the liquid is separated into the liquid 11a keeping a velocity vector in the ejecting direction and the liquid 11c spread on the surface of the heater 931. The position of such separation is desirably the interior of the liquid flow path 1338, preferably a side closer to the electrothermal conversion element 931 than the ejection opening 832.

The main droplet 11a is ejected from the central portion of the ejection opening 832 without deviation in the ejecting direction and ejection slippage and impacted at the prescribed position of a recording surface on a recording medium. The liquid 11c spread on the surface of the heater 931 is ejected as a satellite droplet following the main droplet up to now. However, it remains on the surface of the heater 931 without being ejected.

Since the ejection of the satellite droplet can be prevented as described above, splash, which easily occurs because of the ejection of the satellite droplet, can be prevented, and staining of the recording surface on the recording medium with mist suspended in the form of fog can be surely prevented. In FIGS. 20 to 23, reference characters 11d and 11e indicate an ink (ink within the groove) attached to the groove portion and an ink remaining in the liquid flow path, respectively.

As described above, in the liquid-ejecting head according to this embodiment, the direction of the main droplet upon ejection can be stabilized by the plural grooves dispersed to the center of the ejection opening when the liquid is ejected at the stage that the volume of the bubble decreases after growing into the greatest volume. As a result, a liquid-ejecting head free of slippage in the ejecting direction and high in impact accuracy can be provided. In addition, ejection can be stably conducted against the variation of bubbling at high driving frequency, whereby high-speed and high-definition printing can be realized.

In particular, the liquid is ejected by communicating the bubble with the air for the first time at the stage that the volume of the bubble decreases, whereby mist occurred upon the ejection of the droplet by communicating the bubble with the air can be prevented, so that the state that droplets attach to the ejection opening face, which forms a main cause of the so-called sudden ejection failure, can also be inhibited.

As another embodiment of the recording head of the ejection system that a bubble is communicated with the air upon ejection, may be mentioned the so-called edge shooter type as described in, for example, Japanese Patent Registration No. 2,783,647.

In particular, the present invention has excellent effects in recording heads and recording apparatus of an ink-jet system that thermal energy is utilized to form a droplet to be ejected, thereby conducting recording, among the ink-jet recording systems.

With respect to the typical construction and principle thereof, those using the basic principle disclosed in, for example, U.S. Pat. Nos. 4,723,129 and 4,740,796 are preferred. This system may be applied to any of the so-called On-Demand type and continuous type. In particular, the On-Demand type is effective because at least one driving signal which corresponds to recording information and gives a rapid temperature rise exceeding nuclear boiling is applied to an electrothermal converter arranged corresponding to a sheet or liquid path, in which a liquid (ink) is retained, thereby causing the electrothermal converter to generate thermal energy to cause film boiling on the heat-acting surface of a recording head, so that a bubble can be formed in the liquid (ink) in response to the driving signal in relation of one to one. The liquid (ink) is ejected through an ejection opening by the growth-contraction of this bubble to form at least one droplet. When the driving signal is applied in the form of a pulse, the growth-contraction of the bubble is suitably conducted in a moment, so that the ejection of the liquid (ink) excellent in responsiveness in particular can be achieved. It is therefore preferable to use such pulsed signals.

As the pulsed driving signal, such signals as described in U.S. Pat. Nos. 4,463,359 and 4,345,262 are suitable. When the conditions described in U.S. Pat. No. 4,313,124 that is an invention relating to the rate of temperature rise on the heat-acting surface are adopted, far excellent recording can be conducted.

As the construction of the recording head, such combined constructions (linear liquid flow path or perpendicular liquid flow path) of ejection openings, a liquid flow path and electrothermal converters as disclosed in the above-described publications, and besides constructions based on U.S. Pat. Nos. 4,558,333 and 4,459,600 which disclose the construction that a heat-acting portion is arranged in a curved region may also be included in the present invention.

In addition, constructions based on Japanese Pat. Application Laid-Open No. 59-123670 which discloses the construction that a slit common to a plurality of electrothermal converters are used as an ejection part of the electrothermal converters, and Japanese Patent Application Laid-Open No. 59-138461 which discloses the construction that an opening absorbing pressure wave of thermal energy is provided in opposition to an ejection part may also be effective for the present invention.

Further, as a full-line type recording head having a length corresponding to the longest width of recording media, both construction that the length is met by such a combination of plural recording heads as disclosed in the above-described publications and construction as one recording head integrally formed may be used, and the above-described effects of the present invention can be more effectively exhibited.

In addition, the present invention is effective even when a replaceable, chip type recording head in which electrical connection to an apparatus body and the feed of an ink from the apparatus body become feasible by installing in the apparatus body, or a cartridge type recording head in which an ink tank is provided integrally in a recording head itself is used.

Further, the addition of recovery means for a recording head, preliminary auxiliary means, etc. which are provided as constitution of the recording apparatus according to the present invention is preferred because the effects of the present invention can be more stabilized. Specifically, capping means for the recording head, cleaning means, pressurizing or sucking means, preliminary heating means by electrothermal converters, other heating elements than these or combinations thereof, and preliminary ejection mode that ejection separate from recording is conducted may also be effective for stable recording.

As a recording mode of the recording apparatus, the present invention is extremely effective for not only recording mode using main colors such as black, but also apparatus equipped with at least one of complex color of different colors and full color by color mixing.

In the above-described embodiments of the present invention, the inks have been described as liquid. However, inks solidified at room temperature or lower may also be used so far as they are softened or liquid at a temperature higher than room temperature, or exhibit a liquid phase upon application of recording signals used because it is general in the above-described ink-jet systems that the temperature control of an ink itself is conducted within a range of from 30° C. to 70° C. to adjust the viscosity of the ink so as to fall within a stable ejection range.

In addition, inks that are liquefied by applying thermal energy according to recording signals and ejected as liquid inks, such as inks that temperature rise by thermal energy is positively prevented by using the thermal energy as energy for phase change from a solid phase to a liquid phase and inks solidified in a state left to stand for the purpose of preventing evaporation of the inks, and inks of a nature that they are liquefied for the first time by thermal energy, such as those already beginning to solidify at the time they reach a recording medium, may also be applied to the present invention. In such a case, the inks may be in a form that they are opposed to electrothermal converters in a state retained as a liquid or solid in recesses or through-holes in a porous sheet as described in Japanese Patent Application Laid-Open No. 54-56847 or 60-71260. In the present invention, the above-described film boiling system is most effective for the above-described inks.

Furthermore, as forms of the recording apparatus according to the present invention, forms that the apparatus is integrally or separately provided as an image output terminal for information processing instruments such as word processors and computers, and forms such as copying machines combined with a reader and facsimiles having a transmitting-receiving function may also be adopted.

The outline of a liquid-ejecting apparatus in which the above-described liquid-ejecting head is installed will hereinafter be described.

Figure 29:
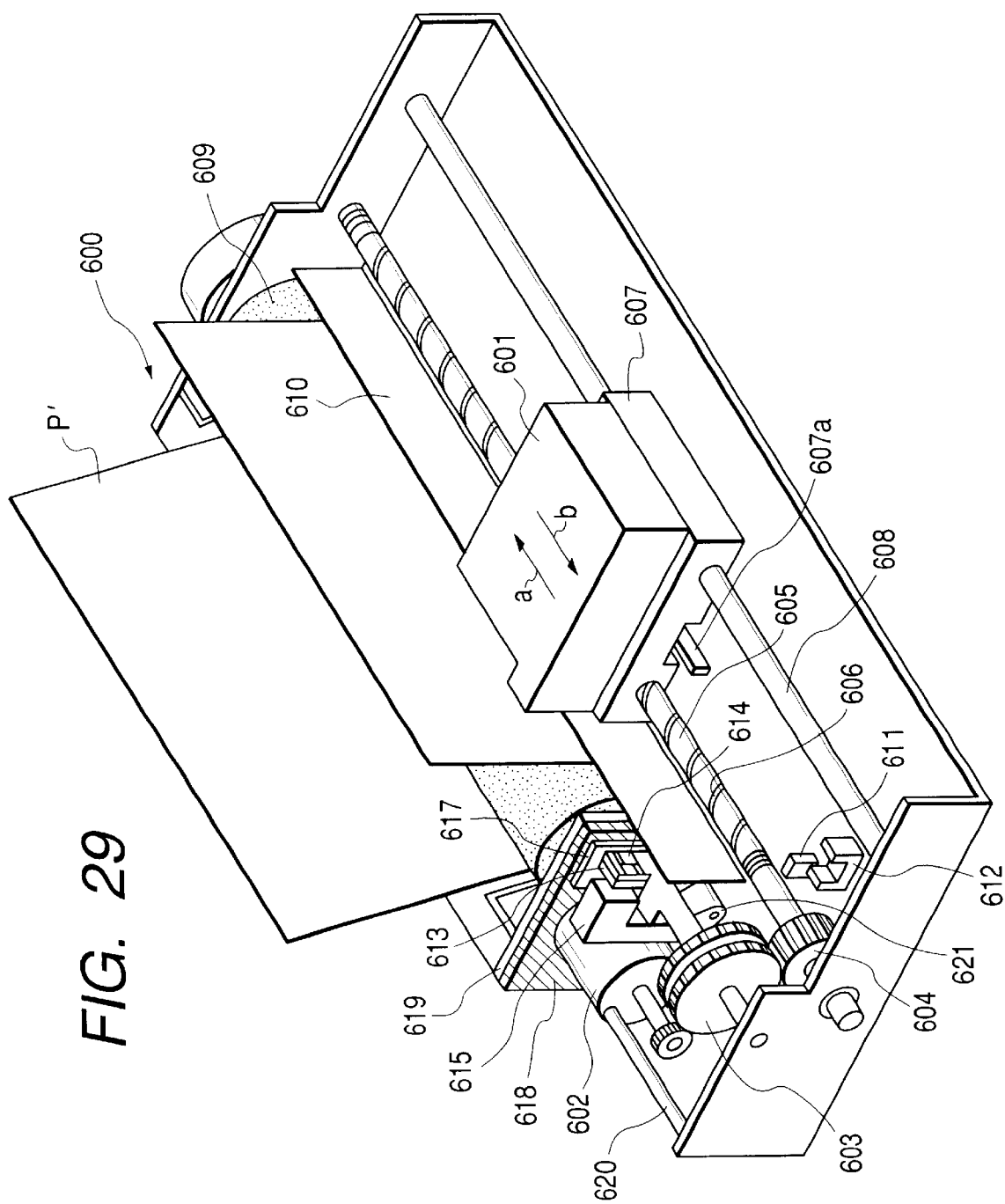
FIG. 29 is a schematic perspective view of an ink-jet recording apparatus which is an example of a liquid-ejecting apparatus to which the liquid-ejecting head according to the present invention can be installed and applied.

FIG. 29 is a schematic perspective view of an ink-jet recording apparatus 600 which is an example of a liquid-ejecting apparatus to which the liquid-ejecting head according to the present invention can be installed and applied.

In FIG. 29, an ink-jet head cartridge 601 is so constructed that the above-described liquid-ejecting head is integrally formed with an ink tank with an ink to be fed to the liquid-ejecting head held therein. The ink-jet head cartridge 601 is mounted on a carriage 607 engaged with a spiral groove 606 in a leadscrew 605 rotating through driving force-transmitting gears 603 and 604 interlocking with the forward and reverse rotations of a driving motor 602 and reciprocatingly moved in directions shown by arrows a, b along a guide 608 together with the carriage 607 by the power of the driving motor 602. A recording medium P' is conveyed on a platen roller 609 by a recording medium-conveying means (not illustrated) and pressed against the platen roller 609 over the moving direction of the carriage 607 by a paper presser plate 610.

Photocouplers 611, 612 are arranged in the vicinity of an end of the leadscrew 605. These are home position-detecting means for confirming the presence of a lever 607a of the carriage 607 in this region to conduct change-over of the rotating direction of the driving motor 602, and the like.

A support member 613 serves to support a cap member 614 covering the front surface (ejection opening face) of the ink-jet head cartridge 601, in which ejection openings are present. An ink-sucking means 615 serves to suck an ink stored in the interior of the cap member 614 by empty ejection or the like from the ink-jet head cartridge 601. By this ink-sucking means 615, suction recovery of the ink-jet head cartridge 601 is conducted through an opening (not illustrated) in the cap. A cleaning blade 617 for wiping the ejection opening face of the ink-jet head cartridge 601 is provided movably in forward and backward directions (directions perpendicular to the moving directions of the carriage 607) by a moving member 618. These cleaning blade 617 and moving member 618 are supported by a body support 619. The cleaning blade 617 is not limited to this form, and any other well-known cleaning blade may be used.

Upon the suction recovery operation of the liquid-ejecting head, a lever 620 for initiating suction is moved with the movement of a cam 621 engaged with the carriage 607, and the driving power from the driving motor 602 is transfer-controlled by a publicly known means such as clutch shift. An ink-jet recording control part for applying a signal to a heater provided in the liquid-ejecting head of the ink-jet head cartridge 601 and conducting drive control of the above-described respective mechanisms is provided on the side of the apparatus body and not illustrated here.

The ink-jet recording apparatus 600 having the above-described construction conducts recording on the recording medium P' conveyed on the platen roller 609 by the recording medium-conveying means (not illustrated) while reciprocatingly moving the ink-jet head cartridge 601 over the full width of the recording medium P'.

The present invention will hereinafter be described more specifically by the following Examples and Comparative Examples. However, the present invention is not limited to and by these examples so far as the subject matter of the present invention is not overstepped. Incidentally, all designations of "part" or "parts" and "%" as will be used in the following examples mean part or parts by mass and % by mass unless expressly noted.

(Preparation of Pigment Dispersion)
<Pigment Dispersion A>

To a solution of 5 g of concentrated hydrochloric acid in 5.3 g of water, were added 1.58 g of anthranilic acid at 5° C. To this solution, were added a solution of 1.78 g of sodium nitrite in 8.7 g of water at 5° C. in a state that the system was always kept at 10° C. or lower by stirring in an ice bath.

After the resultant mixture was stirred further for 15 minutes, 7 g of carbon black having a surface area of 220 $m^2/g$ and a DBP oil absorption of 105 mL/100 g were added under stirring. Thereafter, the resultant mixture was stirred further for 15 minutes. The resultant slurry was filtered through Toyo Filter Paper No. 2 (trade name; product of Advantes Co.), and the resultant pigment particles were fully washed with water and dried in an oven controlled to 110° C. Water was added to the dried pigment to prepare an aqueous dispersion of the pigment having a pigment concentration of 10 wt %.

The hydrophilic-group density on the surface of the self-dispersing carbon black prepared above was measured in the following manner and was found to be 2.6 $\mu mol/m^2$. The measurement was conducted by measuring the concentration of a sodium ion by an ion meter (manufactured by DKK) and converting the hydrophilic-group density from this value. The sodium ion was replaced by an ammonium ion using an ion-exchange method, thereby obtaining Pigment Dispersion A in which self-dispersing carbon black with a —Ph—COONH$_4$ group introduced into the surface of carbon black was dispersed.

<Pigment Dispersion B>

To a solution of 5 g of concentrated hydrochloric acid in 5.3 g of water, were added 1.58 g of anthranilic acid at 5° C. To this solution, were added a solution of 1.78 g of sodium nitrite in 8.7 g of water at 5° C. in a state that the system was always kept at 10° C. or lower by stirring in an ice bath.

After the resultant mixture was stirred further for 15 minutes, 8 g of carbon black having a surface area of 220 m$^2$/g and a DBP oil absorption of 105 mL/100 g were added under stirring. Thereafter, the resultant mixture was stirred further for 15 minutes. The resultant slurry was filtered through Toyo Filter Paper No. 2 (trade name; product of Advantes Co.), and the resultant pigment particles were fully washed with water and dried in an oven controlled to 110° C. Water was added to the dried pigment to prepare an aqueous dispersion of the pigment having a pigment concentration of 10 wt %.

The hydrophilic-group density on the surface of the self-dispersing carbon black prepared above was measured in the same manner as described above and was found to be 1.6 $\mu mol/m^2$. The sodium ion was replaced by an ammonium ion using an ion-exchange method, thereby obtaining Pigment Dispersion B in which self-dispersing carbon black with a —Ph—COONH$_4$ group introduced into the surface of carbon black was dispersed.

EXAMPLE 1

The following components were mixed and thoroughly stirred into a solution. The resultant solution was then filtered under pressure through a microfilter (product of Fuji Photo Film Co., Ltd.) having a pore size of 3.0 $\mu$m, thereby preparing an ink according to the present invention.

| | |
|---|---|
| Pigment Dispersion A described above | 45 parts |
| Trimethylolpropane | 6 parts |
| Glycerol | 6 parts |
| Diethylene glycol | 6 parts |
| Ethylene oxide adduct of acetylene glycol (Acetylenol EH, trade name) | 0.2 parts |
| Potassium hydroxide | 0.06 parts |
| Water | 36.74 parts. |

EXAMPLE 2

The following components were mixed and thoroughly stirred into a solution. The resultant solution was then filtered under pressure through a microfilter (product of Fuji Photo Film Co., Ltd.) having a pore size of 3.0 $\mu$m, thereby preparing an ink according to the present invention.

| | |
|---|---|
| Pigment Dispersion A described above | 45 parts |
| Potassium benzoate | 1.7 parts |
| Trimethylolpropane | 6 parts |
| Glycerol | 6 parts |
| Diethylene glycol | 6 parts |
| Ethylene oxide adduct of acetylene glycol (Acetylenol EH, trade name) | 0.2 parts |
| Water | 35.1 parts. |

EXAMPLE 3

The following components were mixed and thoroughly stirred into a solution. The resultant solution was then filtered under pressure through a microfilter (product of Fuji Photo Film Co., Ltd.) having a pore size of 3.0 $\mu$m, thereby preparing an ink according to the present invention.

| | |
|---|---|
| Pigment Dispersion B described above | 45 parts |
| Potassium benzoate | 1.7 parts |
| Trimethylolpropane | 6 parts |
| Glycerol | 6 parts |
| Diethylene glycol | 6 parts |
| Ethylene oxide adduct of acetylene glycol (Acetylenol EH, trade name) | 0.2 parts |
| Water | 35.1 parts. |

EXAMPLE 4

The following components were mixed and thoroughly stirred into a solution. The resultant solution was then filtered under pressure through a microfilter (product of Fuji Photo Film Co., Ltd.) having a pore size of 3.0 $\mu$m, thereby preparing an ink according to the present invention.

| | |
|---|---|
| Pigment Dispersion A described above | 45 parts |
| Ammonium benzoate | 0.7 parts |
| Potassium benzoate | 0.9 parts |
| Trimethylolpropane | 6 parts |
| Glycerol | 6 parts |
| Diethylene glycol | 6 parts |
| Ethylene oxide adduct of acetylene glycol (Acetylenol EH, trade name) | 0.2 parts |
| Water | 35.2 parts. |

EXAMPLE 5

The following components were mixed and thoroughly stirred into a solution. The resultant solution was then filtered under pressure through a microfilter (product of Fuji Photo Film Co., Ltd.) having a pore size of 3.0 $\mu$m, thereby preparing an ink according to the present invention.

| | |
|---|---|
| Pigment Dispersion A described above | 45 parts |
| Ammonium benzoate | 1.5 parts |
| Trimethylolpropane | 6 parts |
| Glycerol | 6 parts |
| Diethylene glycol | 6 parts |
| Ethylene oxide adduct of acetylene glycol (Acetylenol EH, trade name) | 0.2 parts |

| | |
|---|---|
| Potassium hydroxide | 0.06 parts |
| Water | 35.24 parts. |

COMPARATIVE EXAMPLE 1

The following components were mixed and thoroughly stirred into a solution. The resultant solution was then filtered under pressure through a microfilter (product of Fuji Photo Film Co., Ltd.) having a pore size of 3.0 μm, thereby preparing an ink according to the present invention.

| | |
|---|---|
| Pigment Dispersion A described above | 45 parts |
| Trimethylolpropane | 6 parts |
| Glycerol | 6 parts |
| Diethylene glycol | 6 parts |
| Ethylene oxide adduct of acetylene glycol (Acetylenol EH, trade name) | 0.2 parts |
| Aqueous ammonia (28%) | 0.06 parts |
| Water | 36.74 parts. |

COMPARATIVE EXAMPLE 2

The following components were mixed and thoroughly stirred into a solution. The resultant solution was then filtered under pressure through a microfilter (product of Fuji Photo Film Co., Ltd.) having a pore size of 3.0 μm, thereby preparing an ink according to the present invention.

| | |
|---|---|
| Pigment Dispersion A described above | 45 parts |
| Lithium benzoate | 1.4 parts |
| Trimethylolpropane | 6 parts |
| Glycerol | 6 parts |
| Diethylene glycol | 6 parts |
| Ethylene oxide adduct of acetylene glycol (Acetylenol EH, trade name) | 0.2 parts |
| Water | 35.4 parts. |

COMPARATIVE EXAMPLE 3

The following components were mixed and thoroughly stirred into a solution. The resultant solution was then filtered under pressure through a microfilter (product of Fuji Photo Film Co., Ltd.) having a pore size of 3.0 μm, thereby preparing an ink according to the present invention.

| | |
|---|---|
| Pigment Dispersion B described above | 45 parts |
| Lithium benzoate | 1.4 parts |
| Trimethylolpropane | 6 parts |
| Glycerol | 6 parts |
| Diethylene glycol | 6 parts |
| Ethylene oxide adduct of acetylene glycol (Acetylenol EH, trade name) | 0.2 parts |
| Water | 35.4 parts. |

COMPARATIVE EXAMPLE 4

The following components were mixed and thoroughly stirred into a solution. The resultant solution was then filtered under pressure through a microfilter (product of Fuji Photo Film Co., Ltd.) having a pore size of 3.0 μm, thereby preparing an ink according to the present invention.

| | |
|---|---|
| Pigment Dispersion A described above | 45 parts |
| Ammonium benzoate | 1.5 parts |
| Trimethylolpropane | 6 parts |
| Glycerol | 6 parts |
| Diethylene glycol | 6 parts |
| Ethylene oxide adduct of acetylene glycol (Acetylenol EH, trade name) | 0.2 parts |
| Water | 35.3 parts. |

Main features of the black inks according to EXAMPLEs 1 to 5 and COMPARATIVE EXAMPLEs 1 to 4 thus obtained are shown collectively in Table 1.

TABLE 1

| | Compound added | Potassium concentration (based on carbon) | Hydrophilic group density ($\mu mol/m^2$) |
|---|---|---|---|
| EX. 1 | Potassium hydroxide | up to 0.93% | 2.6 |
| EX. 2 | Potassium benzoate | up to 9.22% | 2.6 |
| EX. 3 | Potassium benzoate | up to 9.22% | 1.6 |
| EX. 4 | Ammonium benzoate, Potassium benzoate | up to 4.88% | 2.6 |
| EX. 5 | Ammonium benzoate, Potassium hydroxide | up to 0.93% | 2.6 |
| COMP. EX. 1 | Ammonia | ≈ 0 | 2.6 |
| COMP. EX. 2 | Lithium benzoate | ≈ 0 | 2.6 |
| COMP. EX. 3 | Lithium benzoate | ≈ 0 | 1.6 |
| COMP. EX. 4 | Ammonium benzoate | ≈ 0 | 2.6 |

Each of the inks according to EXAMPLEs 1 to 5 and COMPARATIVE EXAMPLEs 1 to 4 was used to conduct the following evaluation by means of an ink-jet recording apparatus (BJF-850, trade name, manufactured by Canon Inc.) having an On-Demand type multi-recording head which ejects an ink by applying thermal energy in response to recording signals to the ink. The recording apparatus was used without modifying.

1) Intermittent Ejection Stability

After each of the inks and the ink-jet recording apparatus were used to conduct printing on a sheet of A4-sized paper (210 mm×297 mm, JIS P 0138-1961), the ejection of the ink was stopped for 2 hours, and printing was then resumed on a sheet of A4-sized paper. This printing cycle was repeated 50 times, thereby evaluating the ink as to intermittent ejection stability by observing the degree of printing disorder in each cycle.

2) Crusting Property

After each of the inks and the ink-jet recording apparatus were used to conduct initial printing, the ejection of the ink was stopped for 72 hours, and printing was then resumed. The crusting property of the ink was evaluated from the number of recovery operations required until the state of printing conducted after 72 hours was recovered to the state of the initial printing.

As the result of the above-described evaluation, both intermittent ejection stability and crusting property of the ink according to EXAMPLE 1 were clearly improved compared with the ink of COMPARATIVE EXAMPLE 1. The ink according to EXAMPLE 2 was also clearly improved in intermittent ejection stability and crusting property compared with the ink of COMPARATIVE EXAMPLE 2. The ink according to EXAMPLE 3 was improved in intermittent ejection stability and crusting property compared with the ink of COMPARATIVE EXAMPLE 3. The inks according to EXAMPLEs 4 and 5 were clearly improved in intermittent ejection stability and crusting property compared with the ink of COMPARATIVE EXAMPLE 4.

According to the present invention, as described above, there can be provided water-based pigment black inks, which can provide prints high in image density by ink-jet recording with the black inks, and have excellent intermittent ejection stability and crusting property, and ink-jet recording processes and ink-jet recording apparatus using such an ink.

What is claimed is:

1. An ink for ink-jet recording, comprising a coloring material and an aqueous medium, wherein the coloring material comprises a self-dispersing carbon black, including a hydrophilic group bound to the surface thereof directly or through another atomic group, the ink further comprising potassium ions in an amount of 0.6 wt % or more based on the weight of the self-dispersing carbon black, wherein the density of said hydrophilic group is at least 1.8 $\mu mol/m^2$.

2. The ink according to claim 1, wherein said hydrophilic group is selected from the group consisting of —COOM, —$SO_3$M, —$PO_3$HM and —$PO_3M_2$, wherein M is selected from the group consisting of hydrogen, alkali metal, ammonium and organic ammonium.

3. The ink according to claim 1 or 2, wherein said potassium ions are present as counter ions to said hydrophilic group.

4. The ink according to claim 1, wherein said potassium ions are derived from potassium hydroxide.

5. The ink according to claim 1, wherein pH of the ink is in the range of from 7 to 10.

6. The ink according to claim 1, wherein the ink contains monovalent cations of from 0.05 mol/L to 1 mol/L.

7. The ink according to claim 6, wherein said monovalent cation comprises potassium ions and at least one selected from the group consisting of alkali metal ions, ammonium ions and organic ammonium ions.

8. The ink according to claim 6, wherein the ink contains monovalent cations of from 0.1 mol/L to 0.5 mol/L.

9. An image recording process comprising the steps of applying energy to the ink of claim 1, and ejecting the ink from a recording head towards a recording medium.

10. The image recording process according to claim 9, wherein the recording head is capable of ejecting the ink in an amount of 40 ng per dot or less.

11. The image recording process according to claim 9, wherein the recording head has an ink flow path having a site where flow resistance of the ink is greatly changed.

12. The image recording process according to claim 9, wherein said energy is thermal energy.

13. The image recording process according to claim 12, wherein said thermal energy is applied by a heater in an ink flow path.

14. The image recording process according to claim 13, wherein said heater is situated opposite to an ejection opening for the ink.

15. The image recording process according to claim 13, wherein the recording head has a site where the direction of a main flow of the ink changes at an angle of at least 90°.

16. The image recording process according to claim 9, wherein said energy is mechanical energy.

17. The image recording process according to any one of claims 9 to 16, wherein said recording medium is a plain paper.

18. A recording unit, comprising an ink container containing the ink of claim 1 and a recording head for ejecting the ink in the form of ink droplets by applying energy to the ink.

19. The recording unit according to claim 18, wherein said recording head is capable of ejecting the ink in amount of 40 ng per dot or less.

20. The recording unit according to claim 18, wherein said recording head has an ink flow path having a site where flow resistance of the ink is greatly changed.

21. The recording unit according to claim 18, wherein said energy is thermal energy.

22. The recording unit according to claim 21, wherein said thermal energy is applied by a heater arranged in an ink flow path.

23. The recording unit according to claim 22, wherein said heater is situated opposite to an ejection opening for the ink.

24. The recording unit according to claim 22, wherein said recording head has a site where the direction of a main flow of the ink changes at an angle of at least 90°.

25. An ink cartridge, comprising an ink container containing the ink of claim 1.

26. An image recording apparatus, comprising a recording unit having an ink container containing the ink of claim 1 and a recording head for ejecting the ink in the form of ink droplets by applying energy to the ink.

27. An image recording apparatus, comprising an ink cartridge equipped with a container containing the ink of claim 1, and a recording head for ejecting the ink in the form of ink droplets by applying energy to the ink.

28. The image recording apparatus according to claim 27, which comprises an ink feed portion for feeding the ink contained in said ink cartridge to said recording head.

29. The image recording apparatus according to claim 26, wherein said recording head is capable of ejecting the ink in an amount of 40 ng per dot or less.

30. The image recording apparatus according to claim 26, wherein said recording head has an ink flow path having a site where flow resistance of the ink is greatly changed.

31. The image recording apparatus according to claim 26, wherein said energy is thermal energy.

32. The image recording apparatus according to claim 31, wherein said thermal energy is applied by a heater arranged in an ink flow path.

33. The image recording apparatus according to claim 32, wherein said heater is situated opposite to an ejection opening for the ink.

34. The image recording apparatus according to claim 32, wherein said recording head has a site where the direction of a main flow of the ink changes at an angle of at least 90°.

35. A method of lessening crusting on a recording head comprising ejecting the ink of claim 1 from the recording head by applying energy to the ink.

36. An ink set, comprising in combination an ink comprising a coloring material selected from the group consisting of respective coloring materials for cyan, magenta, yellow, red, green and blue colors, and the ink of claim 1.

37. A method of lessening crusting on an ink-jet recording head equipped with an ink-ejection opening at a position opposite to an ink ejecting pressure-generating element in an ink-jet recording process comprising the step of ejecting the ink of claim 1 by means of the recording head.

38. A method of lessening crusting on an ink-jet recording head which has an ink flow path having a site where flow resistance of a liquid is greatly changed in an ink-jet recording process comprising the step of ejecting the ink of claim 1 by means of the recording head.

39. The method of lessening crusting according to claim 38, wherein the site where the flow resistance of the liquid is greatly changed is a portion changing the direction of the main flow of the liquid at an angle of at least 90°.

40. A method of improving intermittent ejection stability in an ink-jet recording process comprising the step of repeating a process of applying energy to the ink of claim 1 to eject the ink from a recording head by an ink-jet system at a prescribed time interval.

41. A method of improving an intermittent ejection stability in an ink-jet recording process comprising the step of ejecting the ink of claim 1 plural times at a prescribed interval using a recording head which ejects the ink in a direction opposite to an ink ejecting pressure-generating element.

42. A method of improving an intermittent ejection stability in an ink-jet recording process comprising the step of ejecting the ink of claim 1 plural times at a prescribed time interval using an ink-jet recording head having an ink flow path having a site where flow resistance of a liquid is greatly changed.

43. The method of improving an intermittent ejection stability according to claim 42, wherein the site where the flow resistance of the liquid is greatly changed is a portion changing the direction of the main flow of the liquid at an angle of at least 90°.

44. An image recording apparatus, comprising an ink container containing ink and a recording head for ejecting the ink in the form of ink droplets, the recording head provided with an ejection-energy-generating element for applying ejection-energy to the ink, the ink comprising a coloring material and an aqueous medium wherein the coloring material comprises a self-dispersing carbon black, including a hydrophilic group bound to the surface thereof directly or through another atomic group, and wherein the ink comprises potassium ions in an amount of 0.6 wt % or more based on the weight of the self-dispersing carbon black, and the recording head includes at least one site selected from the group consisting of:
(i) a site where the direction of a main flow of the ink changes at an angle of at least 90°, the site being located upstream of the ejection-energy generating element; and
(ii) a site where the width of a main flow of the ink is 20 $\mu$m or less.

* * * * *

UNITED STATES PATENT AND TRADEMARK OFFICE
CERTIFICATE OF CORRECTION

PATENT NO.    : 6,547,381 B2                                           Page 1 of 1
DATED         : April 15, 2003
INVENTOR(S)   : Tomonari Watanabe et al.

It is certified that error appears in the above-identified patent and that said Letters Patent is hereby corrected as shown below:

Column 6,
Line 38, "an" should read -- a --.

Column 7,
Line 29, "above" should read -- above- --.

Column 14,
Line 58, "an" should read -- and --.

Column 15,
Line 41, "has" should read -- have --.

Column 21,
Line 65, "kogyo" should read -- Kogyo --.

Column 36,
Line 9, "in amount" should read -- in an amount --.

Signed and Sealed this

Eighteenth Day of November, 2003

JAMES E. ROGAN
*Director of the United States Patent and Trademark Office*